US012658699B1

(12) United States Patent
Hesaraki et al.

(10) Patent No.: US 12,658,699 B1
(45) Date of Patent: Jun. 16, 2026

(54) PHOTOVOLTAIC POWER OPTIMIZER WITH OVERVOLTAGE PROTECTION CONTROL AND RAPID SHUTDOWN DEVICE

(71) Applicant: dcbel Inc., Montréal (CA)

(72) Inventors: Reza Hesaraki, Montréal (CA); Ernest Montllo Casabayo, Alma (CA); Hafis Kolapo Umar-Lawal, Montréal (CA); Christophe Wauthy, Montréal (CA)

( * ) Notice: Subject to any disclaimer, the term of this patent is extended or adjusted under 35 U.S.C. 154(b) by 0 days.

(21) Appl. No.: 19/359,265

(22) Filed: Oct. 15, 2025

Related U.S. Application Data

(60) Provisional application No. 63/797,468, filed on Apr. 30, 2025.

(51) Int. Cl.
| | |
|---|---|
| *G05F 1/67* | (2006.01) |
| *H02J 1/00* | (2026.01) |
| *H02J 3/001* | (2026.01) |
| *H02J 3/38* | (2026.01) |
| *H02M 7/49* | (2007.01) |
| *H02J 101/24* | (2026.01) |

(52) U.S. Cl.
CPC ................ *H02J 3/001* (2020.01); *H02J 3/38* (2013.01); *H02J 2101/25* (2026.01)

(58) Field of Classification Search
CPC ....... G05F 1/67; H02J 1/00; H02J 3/38; H02J 3/381; H02J 3/388; H02J 2101/25; H02M 7/49; Y02E 10/56

USPC .......................................................... 307/84
See application file for complete search history.

(56) References Cited

U.S. PATENT DOCUMENTS

2019/0326758 A1    10/2019  Zhu et al.
2025/0147535 A1*    5/2025  Adest ........................ G05F 1/67

FOREIGN PATENT DOCUMENTS

CN      110224668 A     9/2019
WO      2020/133056 A1  7/2020

* cited by examiner

*Primary Examiner* — Rexford N Barnie
*Assistant Examiner* — Xuan Ly
(74) *Attorney, Agent, or Firm* — Anglehart et al.

(57) ABSTRACT

Methods and apparatuses enabling the optimizer of a PV system comprising a DC bus in a series-loop configuration to reliably select, use and control of the MPPT mode vs. the limited power mode vs. rapid shutdown mode when connected in a series-loop circuit to ensure the desired DC bus requirements are met and maintained. The improved system reliability responds to overvoltage during communication latency by preventing overvoltage event between any data or control communication. The methods and apparatuses detailed herein are especially useful for PV systems where the optimizers cannot access the output connection cable that connects and provides electricity to the DC bus (e.g., in a series-loop configuration).

18 Claims, 13 Drawing Sheets

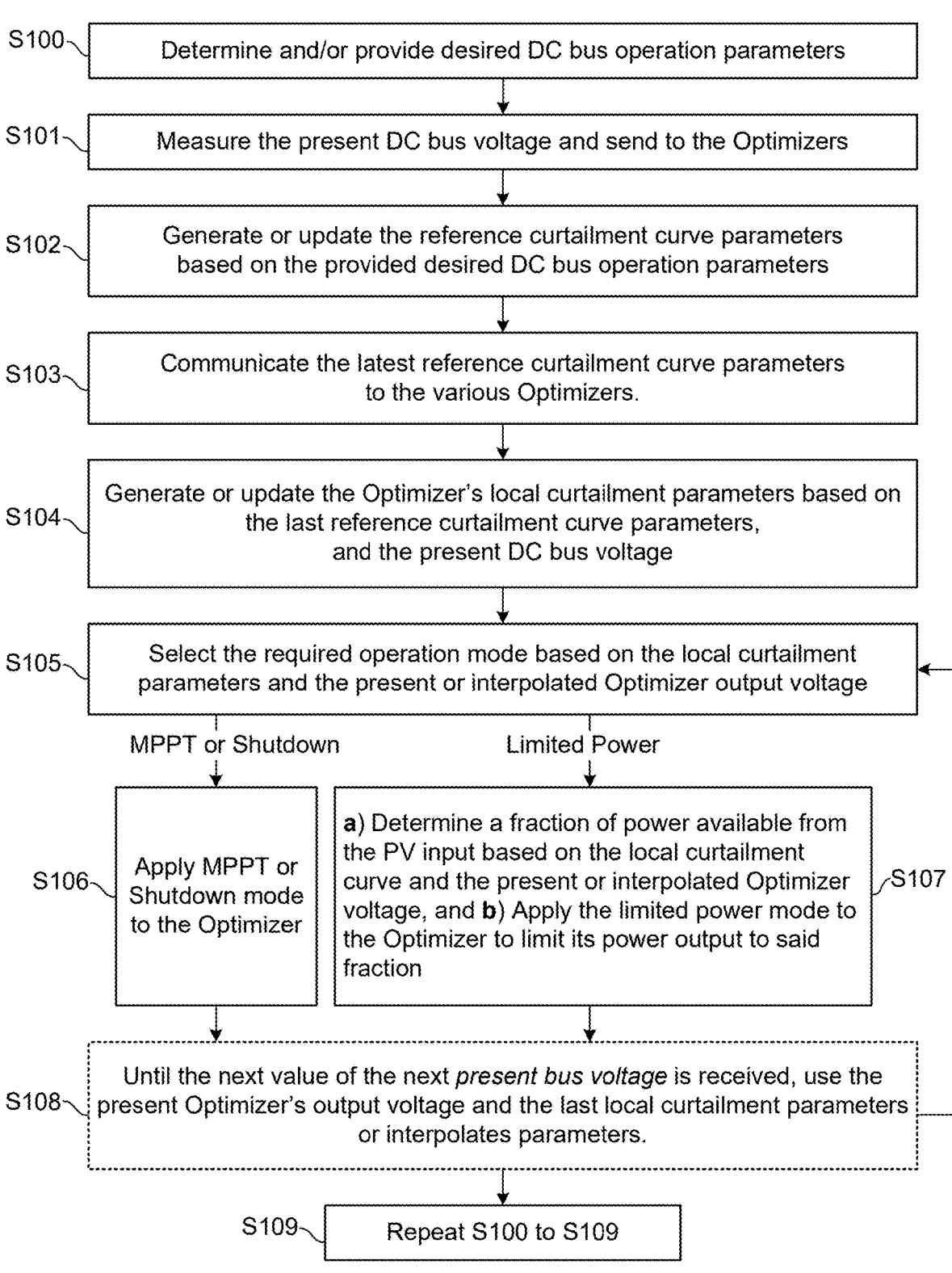

S100 — Determine and/or provide desired DC bus operation parameters

S101 — Measure the present DC bus voltage and send to the Optimizers

S102 — Generate or update the reference curtailment curve parameters based on the provided desired DC bus operation parameters S103 — Communicate the latest reference curtailment curve parameters to the various Optimizers.

S104 — Generate or update the Optimizer's local curtailment parameters based on the last reference curtailment curve parameters, and the present DC bus voltage S105 — Select the required operation mode based on the local curtailment parameters and the present or interpolated Optimizer output voltage MPPT or Shutdown          Limited Power S106 — Apply MPPT or Shutdown mode to the Optimizer S107 — a) Determine a fraction of power available from the PV input based on the local curtailment curve and the present or interpolated Optimizer voltage, and b) Apply the limited power mode to the Optimizer to limit its power output to said fraction S108 — Until the next value of the next *present bus voltage* is received, use the present Optimizer's output voltage and the last local curtailment parameters or interpolates parameters.

S109 — Repeat S100 to S109

FIG. 5

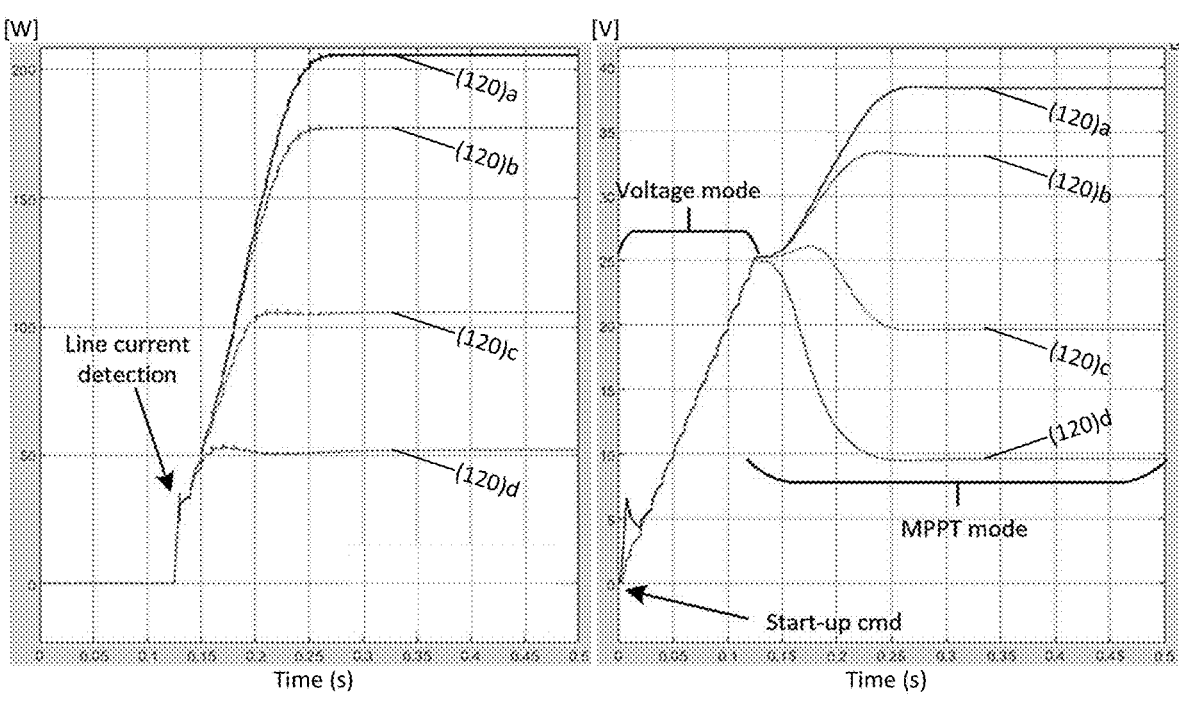
FIG. 6A          FIG. 6B
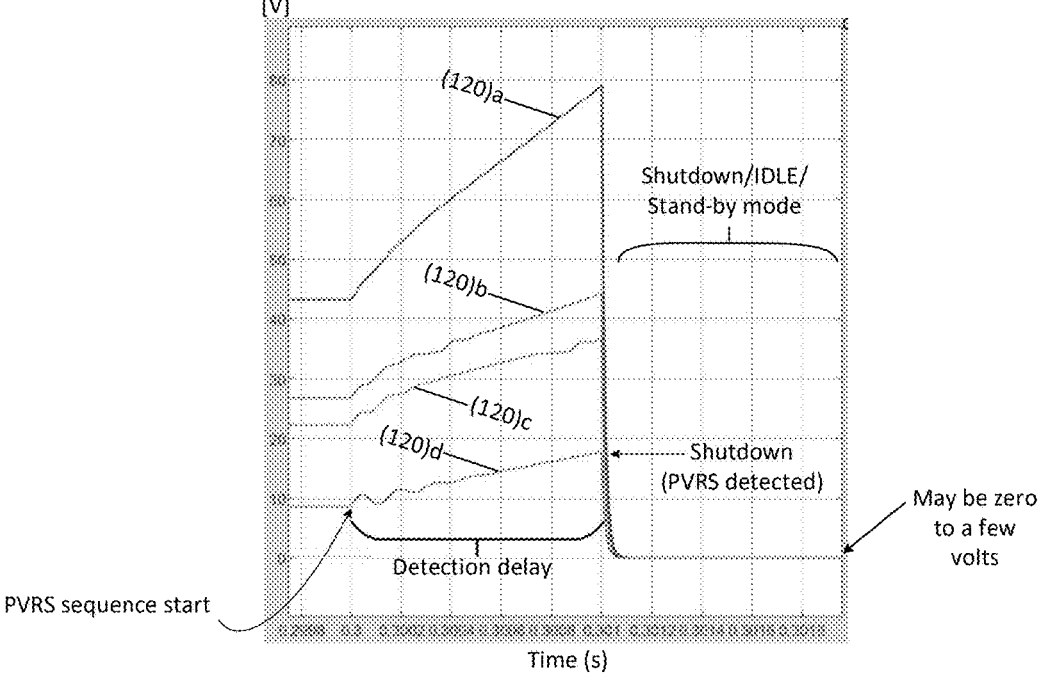
FIG. 7

300

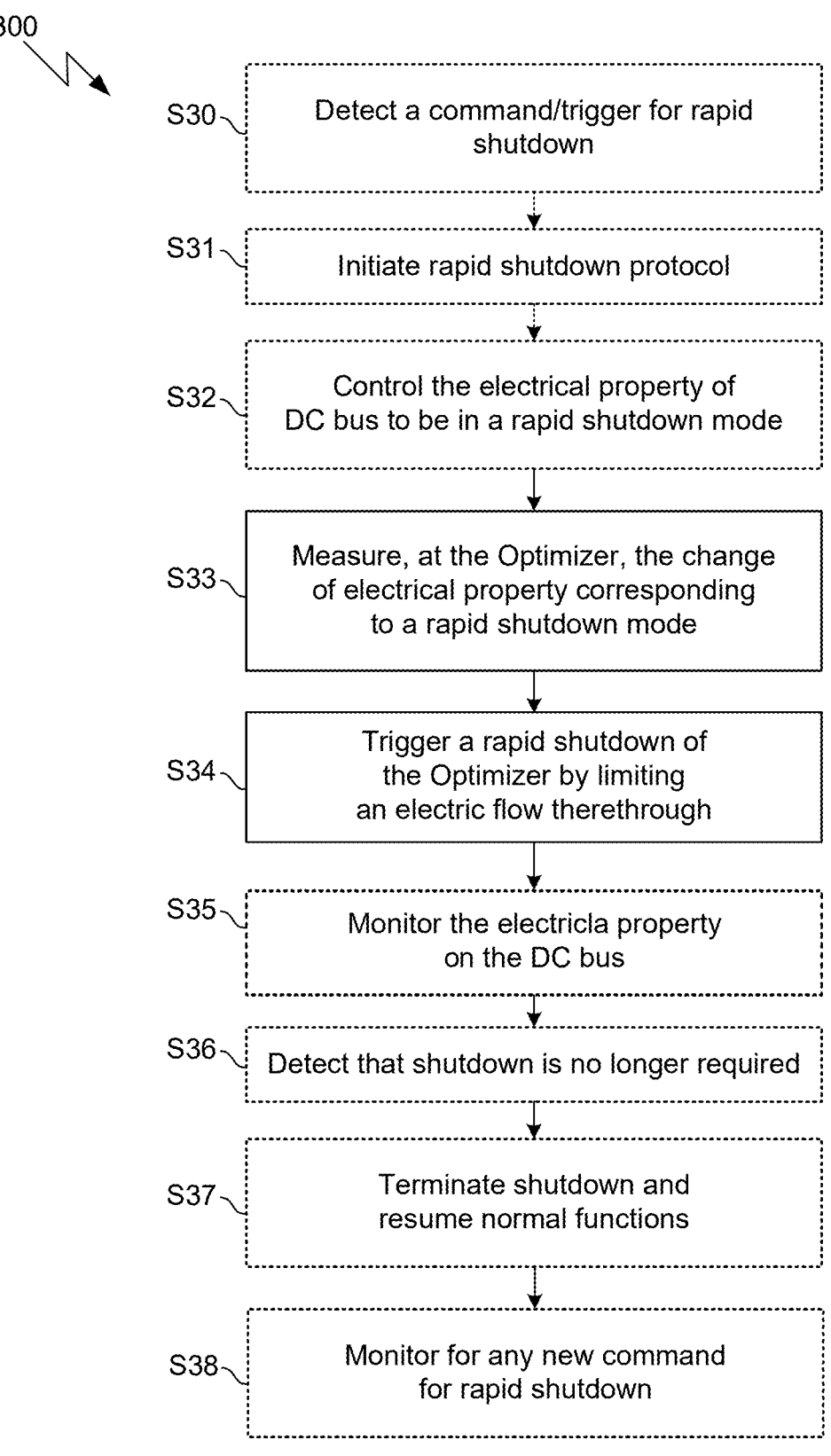

S30 — Detect a command/trigger for rapid shutdown

S31 — Initiate rapid shutdown protocol

S32 — Control the electrical property of DC bus to be in a rapid shutdown mode

S33 — Measure, at the Optimizer, the change of electrical property corresponding to a rapid shutdown mode S34 — Trigger a rapid shutdown of the Optimizer by limiting an electric flow therethrough S35 — Monitor the electricla property on the DC bus S36 — Detect that shutdown is no longer required S37 — Terminate shutdown and resume normal functions S38 — Monitor for any new command for rapid shutdown

FIG. 9

PHOTOVOLTAIC POWER OPTIMIZER WITH OVERVOLTAGE PROTECTION CONTROL AND RAPID SHUTDOWN DEVICE

CROSS-REFERENCE TO RELATED APPLICATIONS

This application claims priority from U.S. Provisional Patent Application 63/797,468 filed Apr. 30, 2025, the contents of which are hereby incorporated by reference.

TECHNICAL FIELD

This document relates to photovoltaic (PV) systems comprising power optimizers, and more specifically to improved controls of power optimizer's functions and PV rapid shutdown systems based on information received from the DC bus, especially when power optimizers are connected in a series-loop string.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Solar panel systems often comprise a plurality of PV cells that can be organized in one or more PV strings and in one or more PV array. If the load connected to the PV array controls the voltage at which power is taken from the PV array, the electrical power extracted will be suboptimal.

Power optimizers, simply optimizers, are used to control the state and characteristics of both the power generated by the PV cells and their power output sent on the DC bus of the PV system. Optimizers of the PV system can include a Maximum Power Point Tracking (MPPT) module to control the DC-DC converter, thereby ensuring that the input power is optimized for the PV cell, PV string or PV array electricity production. The MPPT is used to maximize the energy extraction of the PV cells as conditions vary by controlling the current and/or voltage drawn from the PV input. It is configured to take advantage of the non-linear relationship between temperature and total resistance (often presented as the power/voltage-curves or current/voltage curves of PV cells).

When PV optimizers connect to the PV bus in parallel, it can mean that twice the bus cabling is required in comparison to a PV bus/string having series-loop type connections between the power optimizers. A series-loop configuration can be less costly and easier to install.

The PV bus voltage is typically limited by electrical codes for safety reasons. When optimizers operate in parallel, they may be used to limit the PV bus voltage. However, when optimizers are connected in series, changes in the load or the supply can result in variations in the PV bus voltage that can be outside of acceptable safety limits.

Furthermore, optimizers can be equipped with a PV rapid shutdown system (PVRSS) that enables a rapid drop in PV bus voltage. A PVRSS is important to have in case of an emergency shutdown (e.g., in case of fire) or when maintenance is to be performed on the PV system. A PVRSS can ensure the safety of emergency responders, maintenance personnel, and building occupants by quickly reducing electrical hazards associated with solar PV installations.

To trigger a rapid shutdown (RS) reaction, the state of the art typically uses a communication interface (e.g., a communication wire) to establish a communication between each optimizer, or their PVRSS, and a PVRSS controller on the DC bus to exchange signals and information to shutdown the PV system or to resume its normal functioning. However, this solution should preferably be avoided since it requires additional components and hardware for the PV system, thereby increasing the cost of the PV system.

Therefore, there is a need to develop a method and apparatus to comply with a rapid shutdown of each one of the optimizers without having to exchange signals between the various optimizers of and the DC bus through dedicated hardware.

SUMMARY

The present application presents methods and apparatuses enabling the power optimizer (optimizer) of a PV system to reliably select, use and control of the MPPT mode vs. the limited power mode vs. rapid shutdown mode when connected in a series-loop circuit to ensure the desired DC bus requirements are met and maintained. In some embodiments, the solution can improve the PV system's reliability with regards to overvoltage during communication latency by preventing overvoltage event between any data or control communication (e.g., PLC communication signals).

A first broad aspect of the present disclosure is a photovoltaic (PV) optimizer apparatus connectable between a PV panel and a series-loop string, the apparatus comprising: (1) PV input terminal for connecting to one or more PV panels; (2) series-loop string output terminals comprising a negative output terminal and a positive output terminal; (3) a DC to DC power converter connected to the PV input terminal for power input and to the series-loop string output terminals for power output, the DC to DC power converter having I) a first maximum power point tracking (MPPT) mode of operation in which available power from the PV input terminal is output to the series-loop string output terminals, II) a second limited power mode of operation in which a predetermined portion of available power from the PV input terminal is output to the series-loop string output terminals, and III) a third mode of operation in which a shutdown voltage is output to the series-loop string output terminals; (4) a bypass circuit enabling current to flow between the series-loop string output terminals; (5) communications interface for receiving data from and transmitting data to a PV system communication module (e.g., over the series-loop string us PCL and/or wirelessly), the data comprising at least one control parameter; and (6) a mode controller connected to the communication interface and the DC to DC power converter, wherein the mode controller is for receiving the control parameter from the communication interface for applying one of the first, second and third mode of operation of the DC to DC power converter based on the received data from the series-loop string.

In some embodiments of the PV optimizer apparatus, mode controller applies, based on the received data from the series-loop string, one of the first mode of operation, the second mode of operation and the third mode of operation.

In some embodiments of the PV optimizer apparatus, in absence of signal from the communication interface over a period of time defined by PV rapid shutdown rules or safety standards, the mode controller applies the third mode of operation.

Some embodiments of the PV optimizer apparatus further comprises a loop current sensor for measuring a current of the series-loop string output terminals, wherein the mode controller is responsive to series-loop current measured by the loop current sensor to apply the third mode of operation when the series-loop current drops below a threshold.

In some embodiments of the PV optimizer apparatus, the third mode of operation of the DC to DC power converter is activated when the current of the series-loop reduces below a shutdown threshold.

In some embodiments of the PV optimizer apparatus, the mode controller autonomously controls the applying one of the first mode and the second mode based on a determined voltage of the series-loop string received as one of the at least one control parameter.

In some embodiments of the PV optimizer apparatus, the mode controller is operative to define in the second mode of operation a fraction of available power from the PV input terminal to be output to the series-loop string output terminals based on the at least one control parameter.

In some embodiments of the PV optimizer apparatus, the at least control parameter comprises power curtailment reference function parameters.

In some embodiments of the PV optimizer apparatus, the power curtailment reference function parameters comprise information about a maximum bus voltage point for MPPT operation and a higher bus voltage limit point at which the PV optimizers should output little to no power.

In some embodiments of the PV optimizer apparatus, when the DC to DC power converter operates in the second mode of operation, the DC to DC power converter outputs a fraction of available power from the PV input terminal to be output to the series-loop string output terminals according to a curtailment function or curtailment curve that is based on the information about the maximum bus voltage point for MPPT operation and on the higher bus voltage limit point.

In some embodiments of the PV optimizer apparatus, the power curtailment reference function parameters comprise reference curtailment curve data, and the mode controller is operative to convert the reference curtailment curve data into local reference curtailment curve data defining power curtailment as a function of voltage output to the series-loop string output terminals, the predetermined portion of available power in the second mode being determined by the local reference curtailment curve data.

In some embodiments of the PV optimizer apparatus, wherein the communication interface comprises power line communication (PLC) components.

In some embodiments of the PV optimizer apparatus, the mode controller further comprises a PV rapid shutdown module for controlling the DC to DC power converter to operate in the third mode of operation.

In some embodiments of the PV optimizer apparatus, the mode controller is further applying one of (I) the first mode of operation, (II) second mode of operation, (III) the third mode of operation, and a further (IV) a fourth mode of operation for transferring all available power from the one or more PV panels to the series-loop string output terminals without applying any power conversion to the available power, wherein the mode controller applies the fourth mode of operation when the power input from the PV input terminal is similar to power requirements of the series-loop bus, and using one of the group consisting of: a) the DC to DC power converter; and b) a transparency circuit for connecting the PV input terminal to the series-loop string output terminals.

A second broad aspect of the present disclosure is a PV system comprising: (a) a series-loop string; (b) at least two of the PV optimizers apparatus defined therebefore (see the previous paragraphs), where the series-loop string output terminals of each of the PV optimizers connected in series to the series-loop string; (c) at least one PV panel for each of the at least two PV optimizers, each of the PV panel connected to the PV input terminal of each of the PV optimizers; and (d) a communication module connectable to the series-loop string to communicate to the communications interface of each of the PV optimizers, the communication module comprising a volt sensor for measuring a voltage of the series-loop string and for communicating at least one control parameter based on the measured voltage, wherein applying one of the operation modes from the mode controller of each of the PV optimizers is based on the at least one control parameter.

In some embodiments of the system, the at least one control parameter is power curtailment reference function parameters.

In some embodiments of the system, the power curtailment reference function parameters comprise reference curtailment curve data.

In some embodiments of the system, the at least one control parameter is power curtailment reference function parameters (or reference curtailment curve data) comprises information about a maximum bus voltage point for MPPT operation and a higher bus voltage limit point at which the PV optimizers should output little to no power.

In some embodiments of the PV optimizer apparatus, when the DC to DC power converter operates in the second mode of operation, the DC to DC power converter outputs a fraction of available power from the PV input terminal to be output to the series-loop string output terminals according to a curtailment function or curtailment curve that is based on the information about the maximum bus voltage point for MPPT operation and on the higher bus voltage limit point.

Some embodiments of the system further comprises a DC to AC power converter connectable to the series-loop string for converting DC power from the series-loop string to AC power.

In some embodiments of the system, one of said PV optimizers further comprises a PV rapid shutdown module for local determining a need for rapid shutdown and for triggering a rapid shutdown mode of operation of the one of the PV optimizers.

The present application further relates to methods and apparatus allowing an optimizer to monitor, access and determine various characteristics or states of its DC bus without requiring any exchange of communications signals with the DC bus. The methods and apparatuses may be especially useful for PV systems where the optimizers cannot access the output connection cable that connects and provides electricity to the DC bus (e.g., in a series-loop configuration).

A third broad aspect of the present disclosure is a method of controlling a rapid shutdown (RS) of optimizers of a PV system in a series-loop configuration, the method comprising: (I) providing a plurality of optimizers comprising PV input terminal and output DC terminal; (II) providing at least one PV panel for each one of the plurality of optimizers; (III) providing a bus PV rapid shutdown system (PVRSS) module; (IV) providing a power load; (V) connecting the optimizers in series to a DC bus, through their output DC terminals; (VI) connecting the PVRSS module and the power load to the DC bus; (VII) connecting each of the optimizers to the at least one PV panel, through their PV input terminal; (VIII) using the bus PVRSS module or one of the optimizers to induce a variation of a current of the DC bus, wherein the induced variation of current encodes information about a RS trigger or normal mode trigger; (IX) detect the induced variation of the current; (X) extract the information based on the detected variations of the current; and (XI) control the RS of the optimizers of a PV system by applying the RS if the extracted information comprises the RS trigger or by disabling the RS if the extracted information comprises the normal mode trigger.

In some embodiments of the method, the induced variation of the current is an induced periodic change of amplitude of the current resulting in a sinusoidal change of the current around a value of the DC bus current.

In some embodiments of the method, the induced variation of the current is an increase or decrease of frequency of a carrier frequency on the DC bus current.

In some embodiments of the method, the inducing the variation of the current comprises inducing a change of impedance on the DC bus, wherein the detecting of the induced variation of the current comprises determining an impedance of the bus using one of the optimizers, wherein the information is comprised in the change of impedance being above or below a RS impedance threshold, and wherein the extracting the information comprises determining if the determined impedance is above or below the RS impedance threshold.

In some embodiments of the method, the inducing the variation of the current comprises inducing a change of resistance on the DC bus, wherein the detecting of the induced variation of the current comprises determining resistance of the bus using one of the optimizers, wherein the information is comprised in the change of resistance being above or below a RS resistance threshold, and wherein the extracting the information comprises determining if the determined resistance is above or below the RS resistance threshold.

In some embodiments of the method, the determining an impedance of the DC bus comprises using the one of the optimizers to complete the steps of: (a) at a first time, measuring a first value of the DC bus current while a first output voltage is currently on the DC bus; (b) at a second time, applying a second output voltage by changing an amplitude or frequency of the first output voltage and measuring a second value of the DC bus current while the second output voltage is applied; (c) determining an impedance of the DC bus using a difference of output voltage between the first output voltage and a second output voltage corresponding to the measuring of the second value of the DC bus current, and using a current value difference between the first values of the DC bus current and the second value of the DC bus current; and (d) repeating, at other random times, the steps a) to c) with each other ones of the charges controllers.

In some embodiments of the method, the second output voltage is a step voltage variation from the first output voltage.

In some embodiments of the method, the induced variation of the current is an abrupt decrease or increase of the amplitude of the current.

In some embodiments of the method, the induced variation of the current is induced on the DC bus current by one of the optimizers, wherein the detecting of the induced variation of the current, after going around on the DC bus, is performed by the one of the optimizers, and wherein the variation of the current is one of: (1) an increase or decrease of frequency of a carrier frequency on the DC bus current;

(2) an induced periodic change of amplitude of the current resulting in a sinusoidal change of the current around a value of the DC bus current; and (3) a pulse on the DC bus current.

In some embodiments of the method, the RS is applied or disabled by controlling a DC to DC converter of the optimizers to apply the RS mode of operation.

In some embodiments of the method, when the RS is applied, a residual voltage of less than about 120 volts or less than 60, and preferably less than 10 volts is still outputted by the optimizers onto the DC bus.

In some embodiments of the method, when the RS is being applied, the information comprises the normal mode trigger and wherein the residual voltage is used to apply the method to apply any of the disabling of the RS if needed in response to the normal mode trigger, thereby enabling a normal mode of operation of the optimizers.

In some embodiments of the method, the provided optimizers comprise power line communication (PLC) components, and further comprising: (a) providing a DC bus PLC module;

connecting the DC bus PLC module to the DC bus; (b) determining at least one control parameter; (c) using the DC bus current to communicate data comprising the at least one control parameter by sending the data from the DC bus PLC module, and by receiving and interpreting the data using the PLC components.

In some embodiments of the method, the at least one control parameter comprises reference curtailment parameters and a measure of a present value of the DC bus voltage.

A fourth broad aspect of the present disclosure is a rapid shutdown (RS) apparatus connectable between a PV panel and a series-loop string, the apparatus comprising: (a) an electrical property sensor for measuring an electrical property at series-loop string output terminals when connected to a series-loop string; (b) an RS watchdog comprising an input for receiving the measured electrical property and an analyzer for determining a need for initiating an RS operation mode or a need for initiating a normal operation mode; and (c) an RS controller for controlling at least one of the group comprising i) the control unit, ii) the DC to DC converter, and iii) a solid-state relay, for operating the PC optimizer in the RS operation mode when the RS watchdog has determined the need for initiating the RS operation mode or, and for operating the PC optimizer in a startup operation mode or for disabling the RS operation mode, when the RS watchdog has determined the need for initiating the normal operation mode.

In some embodiments of the RS apparatus, the electrical property sensor is a current sensor and the electrical property is an output terminal current on the series-loop string output terminals, the analyzer for identifying a variation of current of the measured output terminal current, and the RS watchdog is for determining a need for initiating the RS operation mode or a need for initiating a normal operation mode based on the identified variation of current.

In some embodiments of the RS apparatus, the RS watchdog is responsive to a periodic change of amplitude of the output terminal current.

In some embodiments of the RS apparatus, the electrical property sensor is a signal detector circuit for detecting a sinusoidal change of amplitude of an output terminal current.

In some embodiments of the RS apparatus, the electrical property sensor is a signal detector circuit for detecting an increase or decrease of frequency of a carrier frequency of a current of the series-loop string.

In some embodiments of the RS apparatus, the variation of current is due to a change of impedance on a current of the series-loop string, wherein RS watchdog is configured to control a voltage applied to the series-loop string output terminals while measuring the current to determine an impedance of the series-loop string for determining the need for initiating the RS operation mode or the need for initiating a normal operation mode based on whether a change of impedance is above or below a RS impedance threshold.

In some embodiments of the RS apparatus, the variation of current is a sudden decrease or increase of amplitude of the output terminal current.

In some embodiments of the RS apparatus, the RS controller is for controlling the control unit to: (i) operate the PC optimizer in the RS operation mode, when the RS watchdog determines the need for initiating the RS operation mode; and (ii) operate the PC optimizer in a startup operation mode or disable the RS operation mode, when the need for initiating the normal operation mode is determined.

In some embodiments of the RS apparatus, the RS controller is for controlling the DC to DC converter to: (i) operate the PC optimizer in the RS operation mode, when the RS watchdog determines the need for initiating the RS operation mode; and (ii) operate the PC optimizer in a startup operation mode or disable the RS operation mode, when the need for initiating the normal operation mode is determined.

In some embodiments of the RS apparatus, the RS controller is for controlling the solid-state relay to: (i) operate the PC optimizer in the RS operation mode, when the RS watchdog determines the need for initiating the RS operation mode; and (ii) operate the PC optimizer in a startup operation mode or to disable the RS operation mode, when the need for initiating the normal operation mode is determined.

In some embodiments of the RS apparatus, when the RS operation mode is applied, less than about 120 volts or less than 60, and preferably less than 10 volts are still transferred from the PV input terminal to the output terminals.

In some embodiments of the RS apparatus, when the RS operation mode is applied, a less than about 30 V, about 8 A and about 240 V·A are transferred from the PV input terminal to the output terminals.

In some embodiments of the RS apparatus is connected to or part of a photovoltaic (PV) optimizer comprising: (1) a PV input terminal for connecting to one or more PV panels; (2) series-loop string output terminals comprising a negative output terminal and a positive output terminal; (3) a DC to DC power converter connected to the PV input terminal for power input and to the series-loop string output terminals for power output; (4) a bypass circuit for enabling current to flow between the series-loop string output terminals; (5) a control unit for controlling the DC to DC power converter and the bypass circuit; and (6) an optimizer's current sensor.

In some embodiments of the RS apparatus, the electrical property sensor for measuring the electrical property of the RS apparatus is the optimizer's current sensor.

Yet another broad aspect of the present disclosure is a photovoltaic (PV) optimizer apparatus connectable between a PV panel and to a PV series-loop bus, the power converter apparatus comprising: (I) PV input terminals connectable to the PV panel; (II) PV series-loop string output terminals comprising a positive DC terminal and a negative DC terminal; (III) a DC to DC power converter connected to the PV input terminals and the PV series-loop string output terminals, the DC to DC power converter having a normal mode of operation in which available power from the PV input terminals is output to the PV series-loop string output terminals and shutdown mode of operation; (IV) a current sensor connectable to at least one of the PV series-loop string output terminals and for measuring a series-loop current of at least one of the PV series-loop string output terminals; and (V) a rapid shutdown controller providing, in response to a detected change of the measured series-loop current, a rapid shutdown or a start-up of the PV optimizer by controlling the DC to DC power converter.

In some embodiments of the PV optimizer, the DC to DC power converter comprises or is connected to a solid-state relay, and wherein the controlling of the DC to DC power converter comprises opening the solid-state relay to provide the rapid shutdown and closing the solid-state relay to provide the start-up.

In some embodiments of the PV optimizer, the change of the measured series-loop current is a periodic decrease and increase of a magnitude of the measured series-loop current around an average DC current value, wherein the rapid shutdown controller shuts down the functions when the periodic decrease and increase of the magnitude is detected or is no longer detected and wherein the shutdown controller initiates the functions when the periodic decrease and increase of the magnitude is no longer detected or detected, respectively.

In some embodiments of the PV optimizer, the periodic decrease and increase of the magnitude of the measured series-loop current is a pulsed current waveform having a specific frequency, wherein the rapid shutdown controller shuts down the functions when the pulsed current waveform is detected or is no longer detected and wherein the shutdown controller initiates the functions when the pulsed current waveform is no longer detected or detected, respectively.

In some embodiments of the PV optimizer, the change of the measured series-loop current is a frequency of a periodic decrease and increase of the magnitude of the electric flow on the output terminal, wherein the rapid shutdown controller shuts down the functions when the frequency is detected or is no longer detected and wherein the shutdown controller initiates the functions when the frequency is no longer detected or detected, respectively.

In some embodiments of the PV optimizer, the change of the measured series-loop current is a decaying and an increase of the measured series-loop current, wherein the rapid shutdown controller shuts down the functions when the decaying is detected and wherein the shutdown controller initiates the functions when the increasing of the current is detected.

In some embodiments the PV optimizer can be part of a PV system comprising: (a) the series-loop bus; (b) the PV optimizers, where the series-loop string output terminals of each of the PV optimizers connected in series to the series-loop bus; (c) at least one PV panel for each of the at least two PV optimizers, each of the PV panel connected to the PV input terminals of each of the PV optimizers; (d) a bus PVRSS module that determines a need for rapid shutdown and configured to control a bus current to induce the changes of the measured series-loop current thereon; and (e) a system load drawing power from the series-loop.

Another broad aspect of the present disclosure is a method of selecting an operation mode of a photovoltaic (PV) optimizer connectable between a PV panel and a series-loop string, the method comprising: (A) providing the PV optimizer connected to the series-loop string of a PV array or a PV system, wherein the PV optimizer comprises alternative modes of operation comprising: (I) a first maximum power point tracking (MPPT) mode of operation, wherein all available power from the PV input terminal is output to the series-loop string output terminals; (II) a second limited power mode of operation in which a predetermined portion of available power from the PV input terminal is output to the series-loop string output terminals; and (III) a third mode of operation in which a shutdown voltage is output to the series-loop string output terminals; (B) receiving with the optimizer at least one control parameter from a communication module of the PV array or of the PV system; (C) monitoring a voltage output value of the PV optimizer; and automatically determining, using the optimizer, a next mode of operation of the optimizer based on the voltage output value and the at least one control parameter, wherein the next mode of operation is one of the first mode of operation, the second mode of operation and, optionally, the third mode of operation; and (D) operating the optimizer under the determined next mode of operation.

In some embodiments of the method further comprise using the optimizer to automatically determine that the optimizer should be operated under the third mode of operation based on operational conditions; and operating the optimizer under the third mode of operation.

In some embodiments of the method, the operational conditions can include information about a power value, a voltage value or a current value at the input of the optimizer, on the output of the optimizer or on the series-loop string.

BRIEF DESCRIPTION OF THE DRAWINGS

The invention will be better understood by way of the following detailed description of the embodiments of the invention with reference to the appended drawings, in which:

FIG. 5 presents some steps of one embodiment using a curtailment curve to limit the power transferred from the PV input to the series-loop output of the optimizer to manage its operating mode.

FIG. 6A shows power variations over time during a start-up sequence of various optimizers connected in series (in a series-loop string comprising the DC bus of a PV system).

FIG. 6B shows voltage variations over time during a start-up sequence of various optimizers (120a to 120b) connected in series (in a series-loop string comprising the DC bus of a PV system).

FIG. 7 shows voltage variations over time during a PVRS of various optimizers (120a to 120b) connected in series in a series-loop string comprising the DC bus of a PV system of the PV system.

FIG. 9 is a block diagram of an embodiment of a method of providing a PVRS for the optimizer for use in a series-loop string;

DETAILED DESCRIPTION

Figures 1A, 1B, 1C:
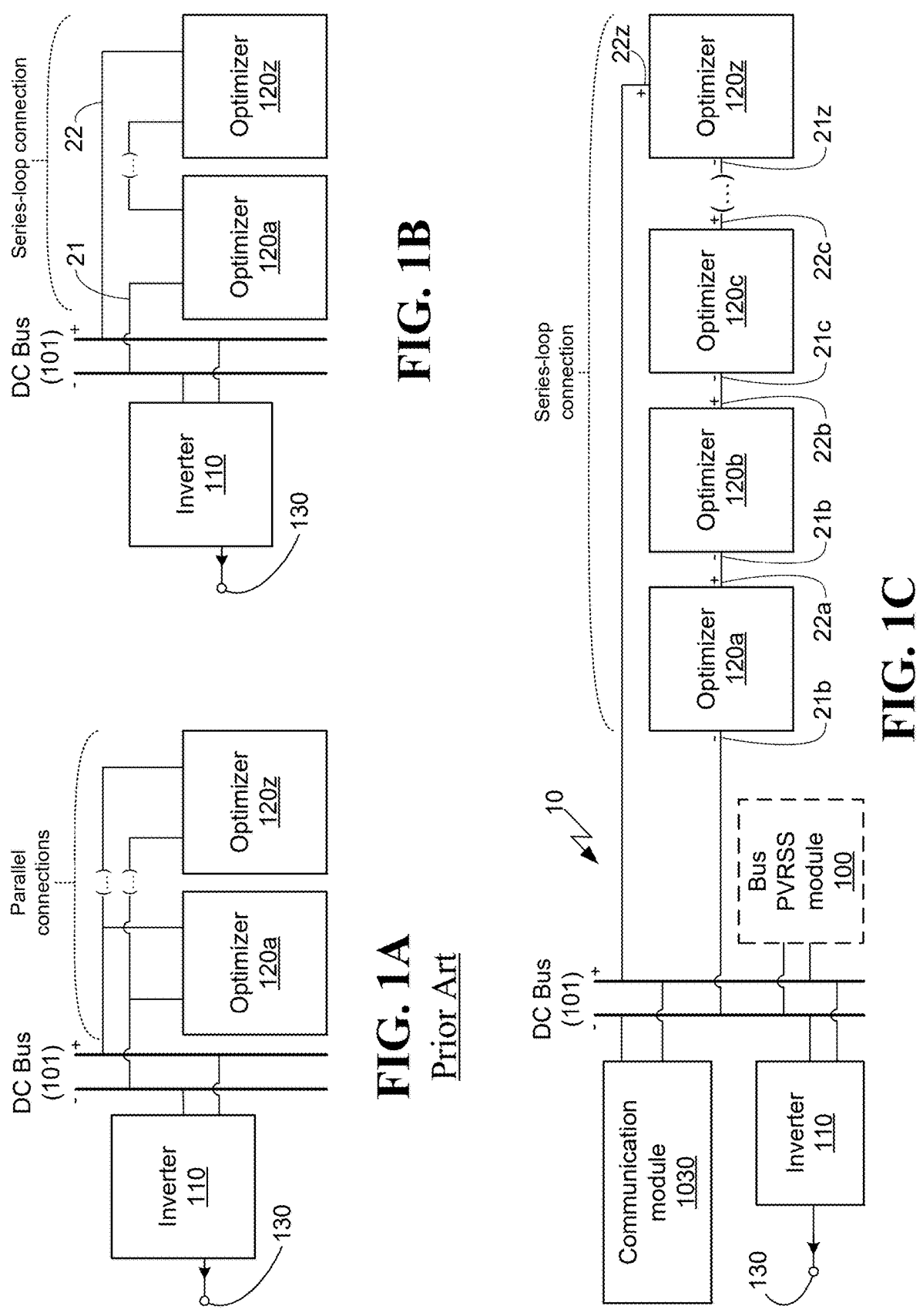
FIG. 1A is a schematic diagram of a state-of-the-art photovoltaic system in a parallel configuration having a plurality of optimizers connected in parallel to the DC bus, thereby sharing a common DC bus voltage and allowing each one of the optimizers to locally measure the DC bus voltage.
FIG. 1B is a schematic diagram of a photovoltaic system in a series-loop configuration (e.g., in order to increase the total loop voltage output) having a plurality of optimizers connected in series in a series-loop string comprising the DC bus, thereby sharing a common loop current, but preventing the optimizers to locally and direct measuring the DC bus voltage.
FIG. 1C is a schematic diagram of a photovoltaic system in a series-loop configuration having a plurality of optimizers connected in series to the DC bus.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

The following is a detailed description of embodiments of the disclosure depicted in the accompanying drawings. The embodiments are in such detail to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, physical processes and components may not have been described in detail in the following so as not to obscure the specific details of the disclosed invention.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

State-of-the-art PV system can include a plurality of power optimizers to control the power transferred from their respective PV cell(s) to the DC bus. Conventionally, photovoltaic panels are connected in parallel (as shown in FIG. 1A) or in series (as shown in FIG. 1B), where Maximum Power Point Tracking (MPPT) is performed to maximize the generated power.

FIG. 1A shows a conventional state-of-the-art PV system 10' comprising various power optimizers 120a to 120z (herein referred to simply as optimizers) connected in parallel to the DC bus 101. It is known to have a plurality of optimizers 120 connected in parallel, thereby allowing each one of the optimizers 120 to share the same voltage output value and to have direct access to the DC bus voltage. In a parallel configuration, each optimizer 120 generally has a direct connection to the DC bus 101. Measuring the voltage on the DC may be useful for detecting a need for RS and/or some embodiments of MPPT that control/adjust the optimizer's function to adapt its output on the DC bus 101.

Parallel configuration for optimizers in a PV system is generally preferred because it can be used to increase the system's current capacity, each optimizer 120 can operate independently to manage is PV array and MPPT functions, and since it can be more resilient since the failure of one of the optimizers may not affect/disrupt the rest of the system stability or functions.

The optimizer can include, but may not be limited to, a DC optimizer, a MPPT, a power amplifier (dB AMP), etc.

FIG. 1B shows a PV system 10' comprising the optimizers 120a to 120z connected in series to the DC bus 101. Optimizers 120 connected in a series-loop string share the same current and can have different voltage output values, which add ups on the loop. In a series-loop configuration, the optimizers 120 cannot locally measure the total/final bus voltage in a series-loop configuration and can only locally know the local current on the series-loop string. In the series-loop configuration of FIG. 1B, the optimizers can only determine their own voltage output (e.g., by knowing the power transferred onto the series-loop and the loop current, since $V_{out}=P_{out}/I_{out}=(V_{in}\times I_{in})/I_{out}$). In this configuration, no optimizer 120 has access to the two sides of the DC bus 101, such that the total/final bus voltage remains locally unknown to the optimizers. Therefore, detecting a need for RS and/or controlling/adjusting the optimizer's functions cannot be achieved using a locally measured DC bus voltage.

Series-loop configuration for optimizers in a PV system could be preferred for various reasons, including the possibility of providing a higher combined voltage for the loop's output (not limited to the individual optimizer's max voltage output), providing a fixed current output, reducing cable length and, potentially, power losses associated with the cable length. The series-loop configuration of optimizers is less common because it comes with its own challenges, such as most available state-of-the-art optimizers are not compatible with the series-loop configurations. For example, the optimizers may not be configured to ensure that their operation in series does not exceed their voltage rating, to provide proper load balancing compatible with the overall system (e.g., desired DC bus voltage), to account for its own or another charger controller's failure (in contrast with the parallel configuration) and/or, simply, to be used in a series configuration.

Therefore there is a need to provide new optimizers and new control methods to improve the use of optimizers in a series-loop by addressing one or more of the above challenges. In the present disclosure, improvements that can be used to provide or optimize functions of optimizers in a series-loop configuration to limit their voltage output to ensure that their voltage ratings are not exceeded, to provide proper load balancing of the overall system by enabling improved (e.g., in real time) load control (e.g., by selecting and applying a best operation mode), which can also be used to account for its own or another charger controller's failure. The new and improved methods and apparatuses may be used to provide local/autonomous RS functions.

Overvoltage Protection

FIG. 1C is a schematic illustration an embodiment of a series-loop of a photovoltaic system 10 having a plurality of optimizers 120 (120a to 120z) connected in series without requiring a specific connection 24 to the DC bus 101 (i.e., where the other side of the DC bus side 22 is not accessible by the optimizers). Note that the negative DC terminal 21 and positive DC terminal 22 respectively correspond to the positive and negative side of the output terminals $121_{out}$ of the optimizers 120.

It will be appreciated that the direction of current flow in the loop and through the optimizers 120 is arbitrary, thus the sign of the voltage difference between terminal 21 and 22 may be the opposite of what is shown in the drawings.

In the configuration presented in FIG. 1C, the first optimizer 120a has a negative DC terminal 21a providing connection to the negative side of the DC bus 101, and a positive DC terminal 22a providing connection to the next optimizer 120b. The "intermediate" optimizers (120b, 120c, etc.) have their respective negative DC terminal (21b, 21c, etc.) that connects them to their previous neighboring optimizer, and their respective positive DC terminal (22b, 22c, etc.) that connects them to their following neighboring optimizer. The last optimizer 120z of the series-loop layout has a negative DC terminal 21z of its series-loop string output terminals providing connection to the previous optimizer 120b and, and a positive DC terminal 22z of its series-loop string output terminals providing connection to the positive side of the DC bus 101.

In a PV system, a DC bus 101 can be connected to an inverter 110, a communication module 1030 (e.g., a Power Line Communication (PLC) module) and the optimizers 120 (120a to 120z). In one embodiment, the PV system comprises a dedicated bus PVRSS module 100 on the Power-Down side of the DC bus 101. It will be appreciated that the bus PVRSS module 100 may be implemented using circuitry and/a processor and memory (not shown). Alternatively, the functions of the bus PVRSS module 100 described in the present document may instead be provided and performed locally at one, some or each PV optimizers (e.g., by their respective rapid shutdown module 127). It will be appreciated that, in some embodiments, both the bus PVRSS module 100 and the rapid shutdown module 127 may be required.

It will be appreciated that the PV system 10 of FIG. 1C with the optimizers 120 RS can be provided with a DC bus communication module 1030, which can be, in some embodiments, an essential component enabling the method. The communication module 1030 can be configured to exchange (send and/or receive) data/information in the form of communication signals onto/through the electric wiring.

In some embodiments, the communication module 1030 may be configured to communicate with the plurality of optimizers 120 to send control commands, curtailment parameters, and operation mode signals thereto and/or to receive data (e.g., operation mode, telemetry, etc.) therefrom (e.g., to poll the optimizers). In one embodiment, the communication module 1030 may use PLC to poll the optimizers except the ones in shutdown/standby mode of operation. In some embodiments, the communication module 1030 can poll the optimizers even when they are in shutdown mode (e.g., using an alternative communication method, such as Bluetooth® or Wi-Fi).

The PV systems of FIG. 1C can comprise a power converter (e.g., an inverter 110) having as an input the DC bus 101 and as an output a power load 130 (e.g., battery, appliance, distribution circuit, distribution network, etc.). The inverter being configured to convert the DC bus current to the current (AC or DC) required by the power load 130. In some embodiments, the power converter is an inverter 110 that converts the DC power of the DC bus 101 to an AC power for an AC load 130 that may be an AC distribution network which can be a connection to an AC bus (e.g., electric grid, household breaker panel, load, rectifier, EV charger, appliances, etc.), a battery system or any other circuit that can use an AC current. It will be appreciated that, if ever required (e.g., when the distribution circuit is a DC distribution circuit), a DC-to-DC circuit (e.g., charger or converter) can be used instead of the inverter 110 or connected between the inverter and the DC bus 101. It will be appreciated that the power load 130 may include or refer to the power converter of the DC bus (e.g., the inverter 110).

Figure 2:
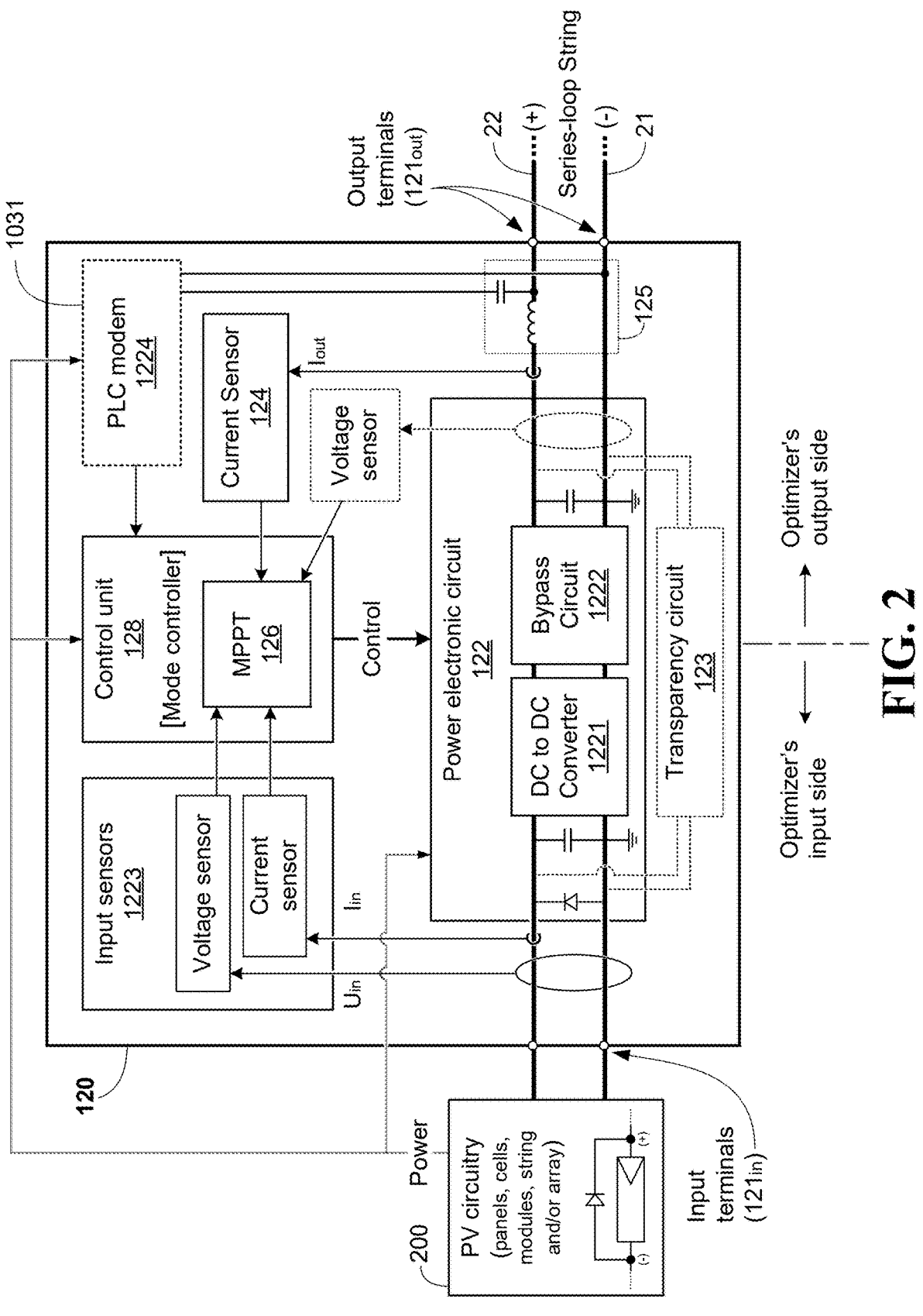
FIG. 2 is a block diagram of the circuit of one possible embodiment of the optimizer of a PV system.

Now referring to the block diagram of FIG. 2 that illustrates possible embodiments of the optimizers 120, some embodiments can include an electronic circuit 122 for converting the electric flow from the input terminal $121_{in}$ to the desired current or voltage output on the output terminal $121_{out}$, a current sensor 124, and control and managing components that may include, an MPPT 126, a control unit 128 or a combination thereof to drive/control the activity of the optimizer 120, for example, by controlling/driving the power electronic circuit 122.

The optimizer 120 can comprise a local communication interface 1031 (which may be different, similar or the same as the communication module 1030) which, in the embodiment of FIG. 2, is illustrated as PLC components 1224 and can play a significant role in automating and optimizing operation of the charger controller 120 as part of the PV system 10. When used in combination with the PV system's communication module 1030 and/or the communication interface of other optimizers, the communication interface 1031 can communicate with various other components of the PV system 10. In one embodiment, the optimizer 120 can communicate information (such as software updates, control commands, curtailment instructions, updated reference curtailment curves, etc.) with the DC bus or control/user interface of the PV system using messages between the local communication interface 1031 and communication module 1030 of the DC bus (or "local" series-loop).

The communication interface 1031 can be any suitable state-of-the-art communication device using wired (e.g., the PLC communication module 1224) or wireless technology (e.g., a PLC, Wi-Fi, Bluetooth®, etc.) that may be compatible to the communication module 1030 of the PV system. In some embodiments, the communication interface 1031 can comprise PLC components (e.g., may be a PLC module 1224) that may be connected to the output terminals $121_{out}$ through a power line filter/separation 125.

The input terminal $121_{in}$ is connectable to the PV circuitry/cell(s) 200, which may be any possible configuration of one or more PV cell(s)/panel(s), module(s), string(s) and/or array connected in series and/or parallel as known in the art. The output terminal $121_{out}$ is connectable to the DC bus and/or to the previous or following optimizer (i.e., it connects to the DC bus when it is the first or the last of the series-connected optimizers).

It will be appreciated that the components of the optimizer 120 that may require a power source to function (e.g., a processor, memory, the control unit 128, the PLC components 1224, the converter circuit 122, etc.) may be connected/configured to be powered by the PV circuitry 200, by the output power of the optimizer from output terminals $121_{out}$ (e.g., via a dedicated circuit to enable the termination of a shutdown/standby mode of operation and initiation of a normal mode of operation that would prevent any power from the PV input), by the DC bus 101, or by any combination thereof.

The power electronic circuit 122 includes a power converter, usually a DC to DC converter 1221, to convert the power generated by the PV circuitry 200 to the power compatible with the DC bus/string in a series-loop configuration. The power electronic circuit 122 may also comprise a bypass circuit 1222 that can be configured to bypass the optimizer 120 altogether when needed (e.g., when it is faulty). A bypass circuit 1222 may be used so that the current of the series-loop string can bypass the PV optimizer, which can result in the current to flow directly between the output terminals $121_{out}$ (i.e., from the negative output terminal to the positive output terminal, or vice versa). It will be appreciated that the bypass circuit 1222 may be configured (e.g., using a diode) to prevent current from flowing in the undesired ("wrong") direction, e.g., from the positive output terminal to the negative output terminal. The bypass circuit 1222 can provide one or both of a first operation mode (e.g., "active" bypass) that can be used to bypass the optimizer without limiting the direction of current flow any specific direction and a second operation mode (e.g., "passive" bypass that may be used to block current flow in the undesired (opposite or "wrong") direction. In some embodiments, where the active bypass is available, the PV system may comprise blocking diodes placed elsewhere (e.g., in the dB Powerdown) on the circuit to prevent current from flowing in the undesired direction. In some embodiments, when the optimizer in the by-pass mode of operation, the converter may be completely inactive and can block the PV source 200 from the series-loop string, instead the bypass circuit is active, and PV power transfer to the series-loop string is disabled. The bypass circuit can ensure continuity for the rest of the string so that other devices down/upstream may continue to operate.

The MPPT 126 of the optimizer can comprise some or all the features of a suitable conventional embodiment known in the art, which may be adapted to control/drive the power electronic circuit 122 to adjust the power drawn from the PV circuit 200 on the input terminal to reach/maintain its maximal power point (e.g., optimal power-vs.-voltage or current-vs.-voltage efficiency) and/or to respect its various characteristics/criteria (e.g., an available power input). The MPPT can further adjust the power conversion of the optimizer to ensure that the electric flow output, on its output terminal, respects some electric flow criteria/needs of the PV system or to optimize it.

In some embodiments, to perform its functions, the MPPT 126 can consider the power generated by the PV circuitry 200 (e.g., by considering the input voltage ($V_{in}$) and input current ($I_{in}$) and their relationship with the power, i.e., Power=Voltage×Current) that can be determined using the input sensors 1223 (input current sensor and/or input voltage sensor), the current output ($I_{out}$) that can be measured with the current sensor 124, and at least one control parameter (e.g., PLC command, DC bus value, reference, curtailment curves, etc.).

In some embodiments, the optimizer can comprise an output voltage sensor to measure the voltage output onto the series-loop string. In some embodiments, the MPPT 126 may use the measured voltage output.

In the optimizer, the MPPT 126 and/or the control unit 128 can be used to control the power drawn from the PV cells 200, either in one of the following possible modes of operation of the optimizer 120:

The "transparency" mode of operation that does not limit nor optimize the power such that all available power is transferred (i.e., duty cycle of 100%). Note that the transparency mode can be enabled by transferring all the power generated by the PV cells 200 to the series-loop string (i.e., to the output terminals $121_{out}$). The transparency mode may not process or modify or convert the power from the PV cells (i.e., it may avoid the power conversion of the DC to DC converter 1221). The transparency mode can be provided by circuitry directly or indirectly connecting the PV cells to the output terminals $121_{out}$. This circuitry can be a dedicated transparency circuit 123, which is illustrated in FIG. 2 as a separate dedicated module of the PV optimizer but can alternatively be comprised in or part of other components of the optimizer (e.g., the power electronic circuit 122 or the DC to DC converter 1221). The transparency mode can be provided by elements and parts of the DC to DC converter 1221, such as dedicated elements (e.g., a dedicated bypass circuit or switch within the DC to DC converter 1221—e.g., to bypass the modulation circuit) or by a specific control (e.g., provided by the control circuit 128 or the MPPT controller 126) of standard elements of the DC to DC converter (e.g., by maintaining the converter in specific "transparency" state: with specific switches closed or open without executing any "switching"). The transparency mode of operation can be activated/controlled by the mode controller (e.g., provided by or integrated into the control unit 128 or the MPPT controller 126), which may activate the transparency mode when the power provided by the PV cells 200 are similar or matches the characteristic requirements (e.g., voltage and/or current) of the series-loop bus. It will be appreciated that the transparency mode of operation could also, if the conditions allow for it, be provided by a sub-mode of operation of the MPPT mode of operation: e.g., when the required PV voltage at the input for achieving maximum power transfer is approximately equal to the voltage at the output terminals, the converter may stop high-frequency switching to reduce losses and directly connect the PV voltage directly to the output, thus operating in the transparency mode.

The bypass mode of operation that can be enabled by the bypass circuit 1222 previously presented.

The Maximum Power Point Tracking (MPPT) mode of operation. In some embodiments, the MPPT mode may be provided by the control unit 128 (e.g., the MPPT controller 126) and the power converter circuit 122 (e.g., the DC to DC converter 1221). The MPPT mode may enable various sub-modes of operation, which may include an MPPT step-down (buck) sub-mode, a MPPT step-up (boost) sub-mode, the above-mentioned MPPT transparency sub-mode, etc. The MPPT buck sub-mode that can, in some embodiments, have the DC to DC converter 1221 use high frequency switching to step-down the PV voltage to match the output voltage when the PV voltage required at the input for achieving maximum power transfer is greater than the voltage at the output terminals. The MPPT boost sub-mode that can, in some embodiments, have the DC to DC converter 1221 use high frequency switching to step-up the PV voltage to match the output voltage when the PV voltage required at the input for achieving maximum power transfer is less than the voltage at the output terminals.

The limited power mode of operation, also referred to as the "curtailment" mode of operation detailed hereafter. In one embodiment, the optimizer 120 can actively process power from the PV source 200 to limit the power transferred to the optimizer's output (e.g., the series-loop string) to a fraction of the maximum power available from the PV source to prevent outputting too much power, voltage and/or current (e.g., to prevent overwhelming the elements thereof with excess energy).

The shutdown (Idle or standby) mode of operation when a shutdown is required (e.g., for RS mode) and for actively limiting the power transferred to the series-loop string in compliance with rapid shutdown regulations (e.g., between zero to a small/trickle voltage, current and/or power output). This shutdown mode of operation can be automatically activated/triggered (e.g., through circuitry or software that automatically respond to detection of one or more corresponding operation conditions, such as a very small down to zero current on the series-loop string for example) or can alternatively be activated/applied by a controller of the optimizer (e.g., based on output parameters and/or operation conditions desired by the DC bus, based on a curtailment parameters or curve, or any other suitable conditions). In one embodiment, the PVRS system can take advantage of PCL communication being disabled (PLC's signals cannot travel or are unreliable) when the current of the power line is zero or is insignificant, such that the shutdown (standby) mode may be automatically activated when the optimizer does not receive or interpret any signal from the PLC for a certain (e.g., predefined) period of time (e.g., a PVRS maximum detection delay defined by the local safety standards), for example, when it is more than 30 seconds (Ontario Electrical Safety Code—Bulletins 64-6-4: PV rapid shutdown Rules 64-200, 64-218). It will be appreciated that the optimizer 120 may communicate its shutdown status to other components of the PV system (e.g., the communication module 1030) using its communication interface 1031, which may be necessary for embodiments requiring a trigger signal or command (e.g., from the communication module 1030) before exiting the shutdown mode of operation and resume other modes of operation.

The startup mode of operation (e.g., to exit the shutdown mode) that, upon reception or detection of a startup trigger, can have the converter initiating a ramp up of its output voltage (e.g., at a linear rate or non-linear rate) to ensure that the series-loop string can reach a stable and desired state.

Figure 4A:
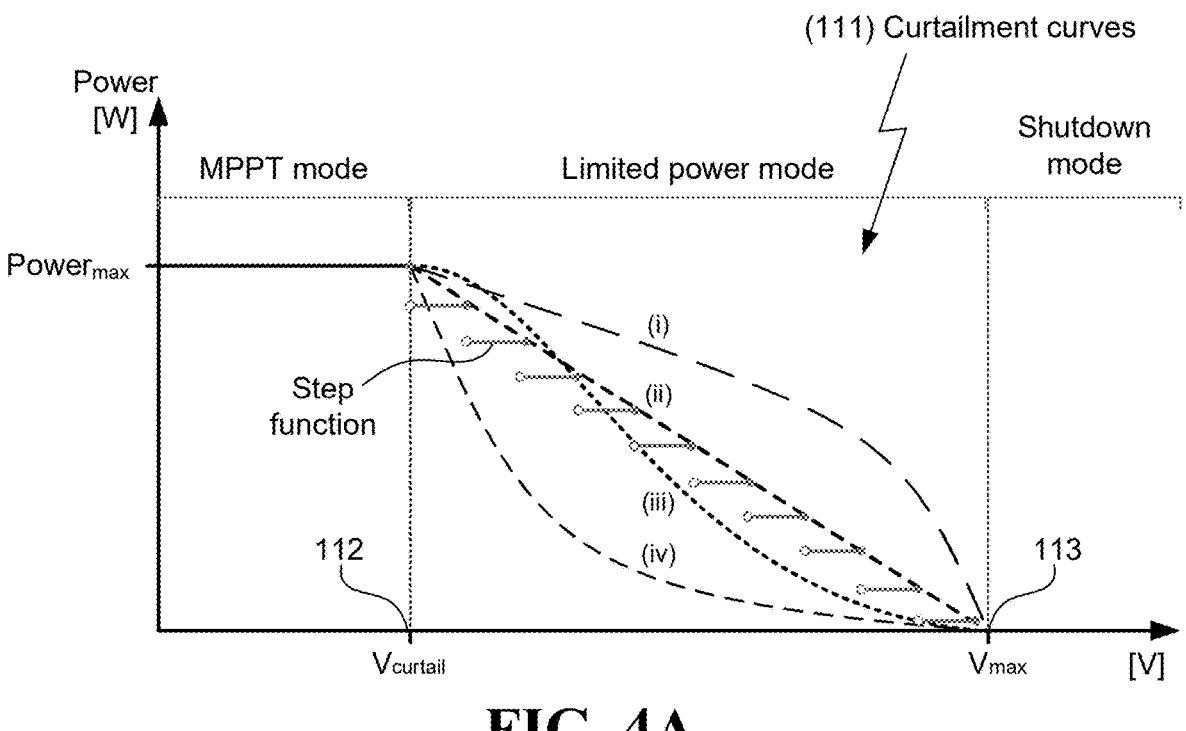
FIG. 4A presents possible embodiments of the curtailment curves for the limited power (curtailment) mode of operation corresponding to a voltage range between the MPPT mode and the shutdown modes of operation.
Figure 4B:
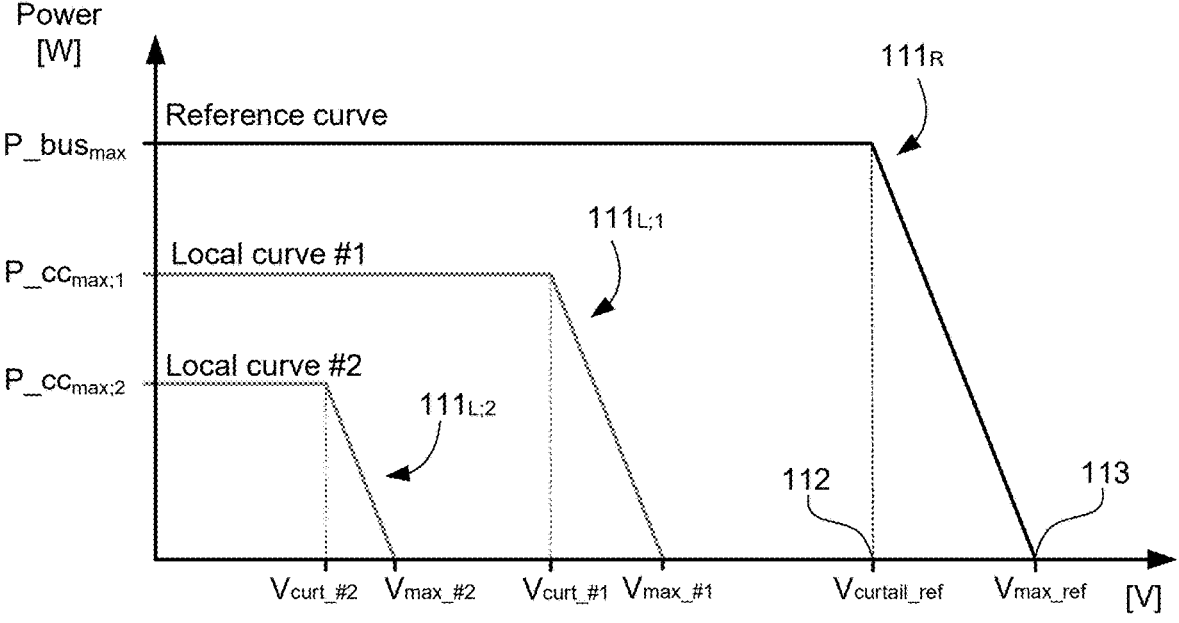
FIG. 4B presents a reference curtailment curve and a local optimizer curtailment curve for various operation conditions of the optimizer based on the reference curtailment curve.

It will be appreciated that some embodiments may only allow selecting only some of the above modes of operations. The mode of operation of the optimizer may be selected externally (e.g., at the DC bus based on limited power mode parameters and/or in response to a control value/parameter/command from the communication module 1030) or internally (e.g., autonomously) based on a local and/or real-time parameter (e.g., a measured current or voltage value at the optimizer's input and/or output and using the last limited power mode parameters) using reference information (e.g., a local control parameter, such as a local curtailment curve $111_L$, as shown in FIG. 4B, that can be based on a limited power mode parameters, such as a reference curtailment curve $111_R$ as shown in FIG. 4A).

When operating the power electronic circuit 122 in the limited power mode, the optimizer 120 can control the power generated by the PV circuitry 200 by taking advantage of the power/voltage-curves or current/voltage curves of PV cells. To do so, in one embodiment operating in the limited power mode, the power electronic circuit 122 can be controlled to limit its input voltage and/or input current to reduce the power generated by the PV cells by moving away from the maximum power point. This operating distinguishes from the MPPT mode, which controls the input current and/or input voltage of the power electronic circuit 122 at the maximum power point (i.e., maximum of the power/voltage-curve or current/voltage curve) to maximize power generated by the PV cells.

While the MPPT 126 of the optimizer 120 can be state-of-the-art MPPT systems/controllers, in some embodiments, the MPPT 126 may be adapted for the specific needs of the optimizer 120 or the PV system 10 (e.g., when used in a series-connected configuration of the optimizers).

In some embodiments, the MPPT 126 can comprise a program and/or circuitry that enables a dynamic (e.g., real time) control of the power electronic circuit to ensure that the electric conversion respects the various constraints and requirements of the PV system 10. For example, the MPPT 126 may use a current sensor and/or a voltage sensor on the output terminal of the optimizer (e.g., on a by-pass side) to ensure that the electric flow output respects the parameters (e.g., required current value).

While the MPPT 126 is illustrated as being part of (being comprehended in) the processing/control unit 128 in the block diagram of FIG. 2, they can be separate elements. While these elements or their functional processes can be integrated or programmed inside a common element, they can alternatively be provided by different components or modules. For example, both the MPPT 126 and control unit 128 can be partly or entirely configured inside program code stored in memory (not shown) to be run by a processor (e.g., any suitable general-purpose programmable hardware: central processing unit, microprocessor unit, DSP, FPGA, etc.), embedded in hardware (e.g., circuitry), or a combination thereof.

The signal/readings/measurements of the current sensor 124 may or may not get processed (e.g., decoupled, filtered, amplified, etc.) by optional dedicated circuit components before reaching the control unit 128 and/or MPPT 126.

It will be appreciated that the various components of the optimizer 120 may be configured to use raw power from the PV circuitry 200, the power electronic circuit 122 and/or the DC bus 101. In some embodiments, a power supply provided by the PV circuitry 200 may be preferable to ensure that the various components are able to perform their functions when a shutdown is ongoing or at least can be powered after the shutdown period. In some embodiments, the power supply may be provided by the power electronic circuit 122 and/or the DC bus 101 as, in shutdown mode, some minimal electric flow may be allowed through to allow for continued monitoring of the DC bus state or variations (e.g., enabling PLC) or specifically to provide power to the various components of the optimizer 120.

In one embodiment, the optimizer 120 can comprise a general controller module that can manage various functions of any embodiment of the optimizer 120. The general controller module (not shown) may comprise various electronic and circuitry/analog components, software components (i.e., memory, at least one processor and program code stored in memory), or a combination thereof. The general controller module may measure or receive the voltage and/or current values on one or both terminals 121 of the optimizer and may be configured to ensure the optimizer 120 functions properly. The general controller module may include any of the necessary elements/components previously mentioned or presented hereafter, which can include, but may not be limited to, a combination of the current sensor 124, the input sensors 1223, any pre-processing element 125, the MPPT 126, a RS module, the control unit 128, the and the electrical property controller 129 (e.g., a current controller, voltage controller, resistance controller or impedance controller). The general controller module may be powered by a PV circuitry 200, the DC bus 101, or both.

The optimizer 120 can comprise various elements and components that can process (decouple, filter, amplify, etc.) the measurements of the current sensor 124 which may or may not be required for any one of the RS module (not shown), the control unit, the MPPT, the power converter circuitry 122, etc. These elements may be selected, connected and used according to the needs of the various embodiments. These elements and components can be implemented with hardware (i.e., with analog components and circuitry), software (e.g., programmed algorithms) or a combination thereof.

For example, the elements and components 125 can isolate and/or extract one or more of the characteristics of the current measurement from the current sensor 124, such as a current amplitude, a current average amplitude, a maximum and/or minimum current amplitude, and a frequency of the current around the average value. It will be appreciated that a noise amplifier can be used to "preprocess" the readings of the current sensor 124 to minimize any noise interference and/or to boost any variation of current that may be too small or noisy to be isolated and/or extracted.

Figure 3:
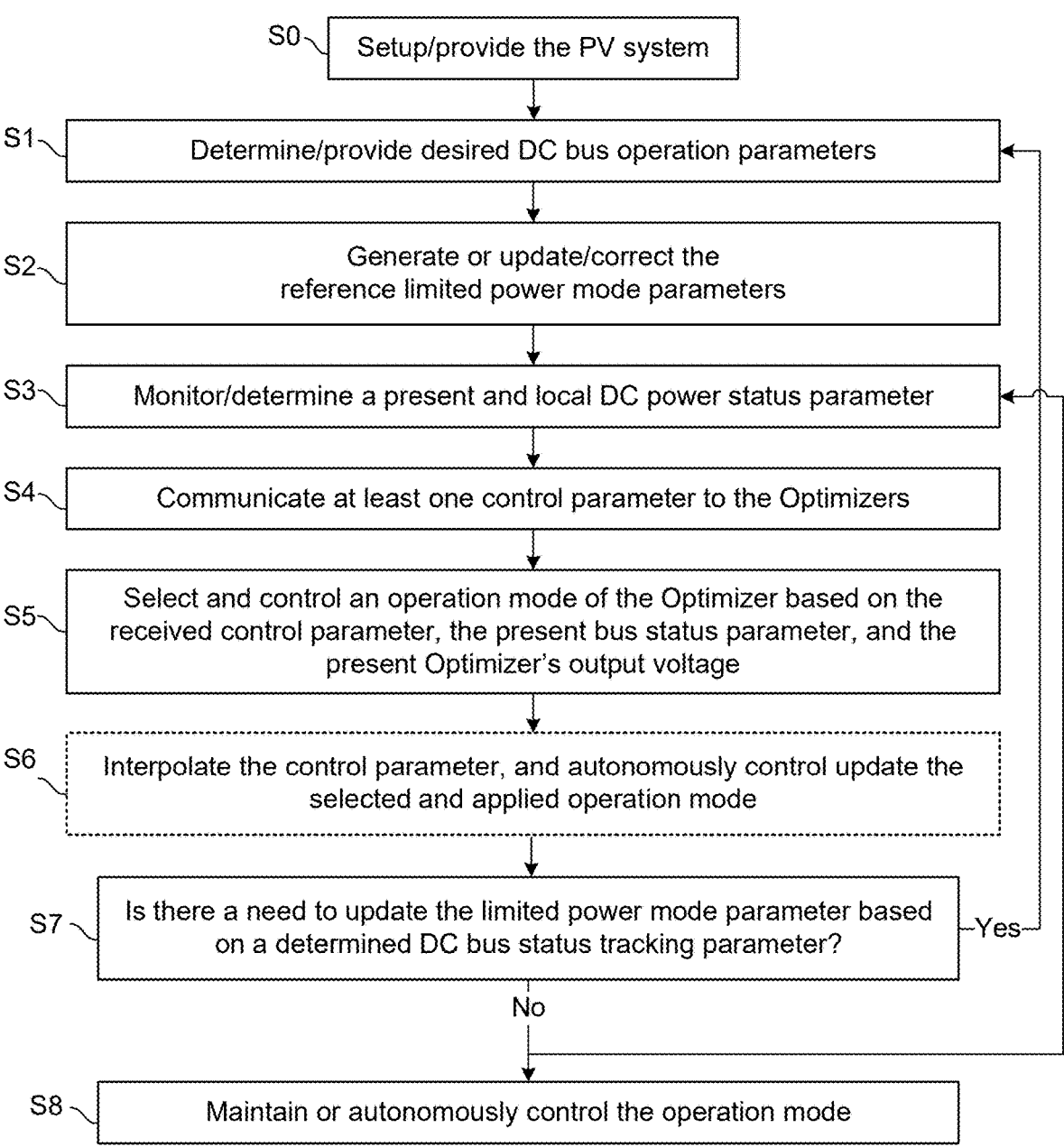
FIG. 3 is a block diagram of an embodiment of a method of controlling an operation mode of the optimizer to respect a desired series-loop power vs. voltage relation and a maximum series-loop voltage.

FIG. 3 presents a block diagram of one embodiment of the method for selecting the operating mode of the optimizer 120 (e.g., MPPT, limited power or shutdown modes) and, if needed, controlling the selected operation mode.

After step S0 of providing, installing, or setting up the PV system (e.g., comprising at least one series-loop DC bus having a plurality of optimizers connected thereon in series) and after starting-up/powering-on the PV system, a first step S1 of determining the desired DC bus operation parameters (e.g., a target, minimum or maximum bus current, voltage and/or power) may be completed autonomously by the PV system (e.g., to satisfy the power, voltage and/or current requirements of the power load 130) or may be provided (e.g., manually by a user) or may be automatically provided by the load 130 (e.g., electric vehicle charging requirements). The desired DC bus parameters are defined so as to ensure that the minimal requirements of the power load 130 are satisfied, which may be crucial for some types of load 130. For example, the desired DC bus parameters may be a maximum DC bus power (e.g., a DC bus power curtailment threshold), maximum DC bus operation parameters (e.g., a maximum bus voltage), a limited power mode threshold defining value (e.g., a bus voltage value) over which the optimizer may function in a limited power mode, or a combination thereof. In some cased a minimum DC bus current or voltage may define a threshold over which the DC bus current, voltage or power must remain.

It will be appreciated that the maximum DC bus voltage or reference maximum voltage ($V_{max\_REF}$) that may define a threshold under which the DC bus voltage must remain, which may be necessary to ensure the safety of the PV system, to optimize the inverter's performance (e.g., reduce losses) and/or to protect the loads 130.

In some embodiments, a limited power mode threshold may be a reference curtailment bus voltage 112. In some embodiments, this threshold may be slightly lower than a maximum DC bus operation parameter and may correspond to the bus parameter (e.g., DC bus voltage) at which the power transfer by the optimizers on the bus should be limited (preferably progressively/gradually limited) and can therefore serve as a threshold to active the limited power operation mode of the optimizers.

Step S2 of generating or updating the reference limited power mode parameters may be completed. Step S2 may first comprise using/processing the previously determined values (e.g., the desired DC bus operation parameters, the maximum DC bus operation parameters, the limited power mode threshold and the at least one present DC bus status parameter) to determine what the boundaries (e.g., thresholds) define the conditions when the limited power mode should be activated. This can imply determining, selecting and/or defining the limited power mode operation parameters that will ensure that the various optimizers can be simultaneously, and optionally autonomously, operated in a way that provides the DC bus with the desired operations parameters. In one embodiment, determining the limited power mode operation parameters can comprise, but is not limited to, or may be used to define a reference curtailment curve 111$_R$ (illustrated in FIG. 4A or 4B).

In some of the embodiments using curtailment curves to have the optimizers automatically select and/or apply the mode of operation and/or control the limited power mode may be based at least in part on maximum DC bus operation parameters, which may include a maximum allowed bus voltage 113 that may be used, along with a reference curtailment bus voltage 112 shown in FIG. 4A or 4B. These DC bus operation parameters may be provided by communication module 1030 and may be used (e.g., in step S2) to define or update reference limited power mode parameters to be considered by the optimizer. The reference limited power mode parameters can correspond or be represented as a reference curtailment curve 111$_R$ as shown in FIG. 4A or 4B.

It will be appreciated that, in the first instance of determining the limited power mode operation parameters, a first set of parameters may be calculated/defined based on an analysis of the desired DC bus operation parameters, the maximum DC bus operation parameters, a limited power mode threshold and the at least one present DC bus status parameter, but, in subsequent iterations, the limited power mode operation parameters may be more simply updated/scaled based on the previously defined limited power mode operation parameters and the latest present or desired DC bus status/operation parameter.

In one embodiment, the reference limited power mode parameters may be suitable reference values for all of the optimizers (e.g., a reference curtailment voltage value $V_{curtail}$ 112 defining a voltage threshold over which the bus voltage should be curtailed/limited and/or a reference maximum voltage value $V_{max}$ 113 defining a voltage threshold around which the bus voltage should be zero or around which the shutdown mode of the optimizers should be activated). In some embodiments, the optimizers may adjust, scale or adapt their local limited power mode parameters based on the reference limited power mode parameters. In one embodiment, the local limited power mode parameters may be determined using the received reference limited power mode parameters and at least one present optimizer parameter (e.g., input or output power, current or voltage).

In one embodiment, the reference limited power mode parameters may be selected from a reference lookup table or database based on the desired DC bus operation parameters (e.g., the power, current and/or voltage requirement of the load 130 or the inverter 110).

If needed, limited power mode parameters may be defined for each type, model or each one of the optimizers. This can result in a specific set of limited power mode parameters for a specific group of optimizers, which may be defined according to their specific connections configuration (e.g., local series-loop requirements), components (e.g., the number of PV cells), capacities (e.g., maximum power output) or operation (e.g., MPPT or PWM).

The limited power mode operation parameters may define a limited power output of the optimizer 120 onto its DC bus to a portion/fraction of its total power input from its PV circuitry 200. In an embodiment, the portion of total available power transferred onto the DC bus may be defined by or can be controlled in response to the present DC bus status parameter (e.g., the present DC bus voltage), using some of the received reference limited power mode parameters, and using the present optimizer output voltage.

Step S3 of determining (e.g., monitoring, measuring or calculating) at least one present DC power status parameter (e.g., conduction detection, real-time/present string and/or bus voltage, current and/or power) of the local series-loop string.

Step S4 of communicating at least one control parameter to one or more of the optimizers of the PV system. The control parameter(s) may be any suitable information that can be used, e.g., in combination with the reference limited power mode parameters, to select between the various operation modes (e.g., PWM, MPPT, limited power or shutdown modes) of the optimizer 120 and to control the selected operation mode if needed. In some embodiments, the control parameter can comprise the latest reference limited power mode parameters (e.g., the reference curtailment curve 111$_R$) and/or the present DC bus status parameter. In one embodiment, the control parameter may be a specific command to operate in any one of the available operation modes. In one embodiment operating in the limited power mode, the control parameter may be a fraction value defining at which portion of the total available power from the PV circuit 200 can be transferred to the DC bus. In some embodiments, the control parameter can include the present or latest DC bus voltage or the local series-loop voltage. In one embodiment, the control parameters are communicated to all of the optimizers, which may be achieved by exchanging information between the communication interface 1031 (e.g., PLC components 1224 or wireless communication) of the optimizers and the communication module 1030 of the PV system. In one embodiment, each optimizer receives a unique version of the control parameters (e.g., a tailored/local curtailment curve 111$_L$) specific to its capacity or model.

The optimizer 120 is configured to complete step S5 of selecting its operation mode between the normal operation mode (MPPT or PWM), the shutdown mode or the limited power mode based on the received control parameter and, optionally, on the present optimizer's output. If needed, in some cases, the control parameter may be used to control the selected operation mode (e.g., determine the fraction of power to transfer onto the bus when operating in the limited power mode). In some embodiments, the mode of operation is selected based on the received control parameter(s) (e.g., the reference limited power mode parameters, such as a reference curtailment curve, and the present bus voltage).

In one embodiment, the control parameter(s) (e.g., reference curtailment curve 111$_R$) may first be processed locally (e.g., based on the available power input) to determine local limited power mode parameters (e.g., by scaling the reference curtailment curve 111$_R$ to generate a local curtailment curve 111$_L$), which are used in combination with the control parameter to select, or when needed, control operation mode.

In one embodiment, the optimizer considered the last received control parameters until a new one is received.

In some embodiments, it may be preferred to determine (e.g., interpolate or extrapolate) intermediate control parameters between reception of the communications/information from the DC bus (e.g., the bus communication module 1030). In fact, since the control parameters are determined and communicated periodically, controlling behavior of the optimizer 120 based on control parameters provided at discrete times may not be as smooth as possible and may induce corrective response delays, which may not provide the desired optimal control.

Optional step S6 of autonomously updating the selection of operation mode or the controlling of the selected mode based on an interpolated (or extrapolated) control parameter may provide an improved way of operating the optimizer. Step S6 can provide a solution that allows smoothing the controlling of the optimizer 120 and improving accuracy of the control of the DC bus parameters by interpolating intermediate control parameters between the received "true" control parameters (i.e., control parameters based on the measured DC bus parameter, e.g., the measured DC bus voltage). The intermediate and/or interpolated control parameters may be determined at a desired time step interval shorter than the communication delay (i.e., latency between the reception of control parameters from the DC bus communication module 1030), thereby improving the stability of the system. It will be appreciated that the limited power mode may be controlled based on these intermediate voltage values, and, in some cases, may lead the optimizer 120 to change its mode of operation between reception of the "true" control parameters. It will be appreciated that, in some embodiments, the interpolation may not be performed nor considered at the moment the "true" control parameters are received.

In one embodiment, the "true" control parameters can be taken at face value.

In a first embodiment of step S6, the autonomous control of the optimizer may be completed using the previous local curtailment curve and the determined output voltage of the optimizer. In this case, the selection of the mode of operation and/or the control of the operation mode (e.g., the limited power mode) may be autonomously (locally) performed by the optimizer until the next communication is received from the communication module 1030.

In a second embodiment of step S6, the interpolated control parameters may be determined from a most likely control parameter for a next intermediate time (between two receptions of the "true" control parameter). In some embodiments, the most likely control parameter for a given intermediate time can be determined based on a linear slope or polynomial curve interpolated or extrapolated from the previous "true" control parameters. Since reducing the communication delays (latency) may reduce the confidence, reducing the need to rely on direct communications from the PCL module 1030 to receive the "true" control parameter(s) can increase confidence in the selection of the mode of operation and/or the control of the limited power mode.

In a third embodiment of step S6 using curtailment curves 111 and a control parameter defining the present DC bus voltage, if an interpolated slope defined by the last two "true" DC bus voltage values received is negative, intermediate voltage values decreasing at a rate defined by said negative slope can be considered until the next "true" DC bus voltage is received and until the interpolated slope is updated.

In a fourth embodiment of step S6 may require to complete the following sub-steps: a) at an initial time T0, the local curve is $V_{Curtail}$=40V and $V_{Max}$=50V and the optimizer's output voltage is 39V, with an MPP of 100 W (since the 39V is below $V_{Curtail}$ such that the optimizer may not be limited in power and can use MPPT to extract optimal power); b) at an intermediate time T0.5, which is between communication points T0 and T1, it can be determined that the present optimizer's output voltage rise to 43V, therefore the following equation can be used to determine the intermediate power that the optimizer will consider until the next communication of the next "true" control parameter $$MPP \frac{(V_{max} - V_{intermediate})}{(V_{max} - V_{curtail})} = 100\text{W} \frac{(50\text{V} - 43\text{V})}{(50\text{V} - 40\text{V})} = 70\text{W};$$

and c) at the following time T1, if the latest bus voltage received is consistent with this 43V increase (meaning that the bus voltage as also increased since T0), the 70 W limitation may be maintained, but if the voltage increase was due to a change in power on the line and the bus voltage was still below the reference curve curtailment voltage, then the limit may be removed (this can be performed by adjusting the local curve with the new bus voltage received). It will be appreciated that this embodiment may assume that any changes in the optimizer's output voltage can be approximated to being due to variations on the bus voltage, which relies on the assumption that solar dynamics (i.e., insolation level and weather changes) are slow and that it should not change the power enough between T0 and T1 to have a significative impact on the output voltage.

In a fifth embodiment of step S6 using curtailment curves, the last local curtailment curve may be considered with the real-time/present local optimizer's output voltage to adjust the operation mode selection or control.

A verification S7 may be completed to determine if the limited power mode parameters need any updating based on the present DC bus parameters, any change of behavior of the optimizers, any changes in the desired DC bus operation parameters (of S1) or any change of the present DC bus status parameters.

If it is determined that the limited power mode parameters need updating, steps S1 to S7 can be repeated to ensure that the updated DC bus operation parameters (e.g., maximum allowed power on the bus, maximum allowed bus voltage, bus current, curtailment voltage or power values, etc.) are determined or provided (step S1'), that the reference limited power mode parameters (e.g., a curtailment voltage value, the reference curtailment curve, etc.) are updated/corrected based on the updated desired operation parameters (step S2'), and so on for the following steps S3 to S7.

For example, when the limited power mode parameters are comprised in a reference curtailment curve $111_R$, there may be a need to update the previous reference curtailment curve for various reasons, such as any significant change in the dynamic of the plurality of optimizers (e.g., the individual contribution to the DC bus from any one of the optimizers of the series-loop).

If it is determined that there is no present need to update the limited power mode parameters, step S8 of maintaining, updating (e.g., by repeating steps S3 to S7) or autonomously controlling the mode of operation of the optimizers may be completed. Thereby providing active and continuous control over the mode of operation.

Steps S1 to S4 and S7 to S8 may be completed at the DC bus 10, the communication module 1030, the inverter 110, or a combination thereof. These steps may require one or more of these elements to be equipped with sensors (e.g., voltage and/or current sensors), memory, and circuitry or a processor.

Steps S5 to S8 may be completed by the optimizer.

FIGS. 4A and 4B present a group of possible embodiments of the limited power mode parameters, specifically curtailment curves 111.

In one embodiment, the curtailment parameters or curve comprises a function of optimizer's power input (or output) as a function of the optimizer's voltage output onto the series-loop string. It will be appreciated that the curtailment parameters should include at least one criterion (e.g., a curtailment voltage value at which the curtailment should begin), and preferably at least two criteria (e.g., a curtailment voltage value and a maximum voltage value).

The curtailment curves 111 may take any suitable shape or form that may be used to provide the DC bus with the minimal desired voltage, maintain the voltage under the maximum allowed voltage, control for the limited power mode, and possibly a shutdown mode.

In most cases, the curtailment curve may be defined using a maximum allowed bus power (Power$_{max}$), the maximum allowed voltage 113 (e.g., optimizer's output voltage) and a curtailment voltage 112 that may be greater than the target desired bus voltage. In such cases, the curtailment curves 111 may be shaped to ensure that normal operation (e.g., PWM or MPPT) of the optimizer is enabled, the limited power mode is provided between the curtailment voltage 112 and the maximum bus voltage 113, and that a rapid shutdown mode of operation is activated near or passed the maximum bus voltage 113.

In a preferred embodiment, the curtailment curve can have a shape similar to one of the various curtailment curves 111 options shown in FIG. 4A. In some embodiments, the curtailment curve 111 may have a zero slope at maximum power (MPPT) for any voltage value lower than the curtailment voltage 112, may cross the y-axis (zero of the x-axis) at the maximum allowed bus voltage 113 that can define a shutdown mode for any value greater than the maximum allowed value 113, and may define a limited power mode of operation after the curtailment voltage 112 and before the maximum allowed value 113 (i.e., between the MPPT portion and the shutdown portion of the curtailment curve).

It will also be appreciated that the MPPT mode may not be limited to a linear curve or a zero slope.

In the schematic representation of FIG. 4A, the various portions of the curtailment curve 111 are identified and are shown as being associated with some of the various possible mode of operations of the optimizer to give a general understanding of the effects of the curtailment curve, which, in some embodiment, may include an MPPT mode (e.g., during which the total/maximum available power is outputted), a limited power mode (e.g., during which a fraction of the total available power is outputted) and shutdown mode of operation (e.g., when zero or a trickle voltage is outputted). It will be appreciated that this schematic identification is used to illustrate the general effects of using one embodiment of the curtailment curve. In other words, the modes of operation, power values, the voltage values, proportions, etc. of the schematic representation shown in FIG. 4A should not be used to limit the scope of the various possible implementation of the curtailment curve. For example, although the shutdown mode of operation is shown as extending from before/around the maximum reference voltage value ($V_{max}$) to above this value, in some embodiment, the shutdown mode may instead be limited around the maximum reference voltage value (e.g., may be initiated just before $V_{max}$ is reached or only once this value is reached). The shutdown mode may not be associated with a portion of the curve and can instead correspond to a discreet triggering value or trigger threshold. It will be appreciated that, because in some embodiments, applying the shutdown mode of operation may change the value of voltage considered for the curtailment curve, once triggered, the shutdown mode may be maintained independently from the curtailment curve.

As illustrated in FIG. 4A, the limited power portion of the curtailment curves may be of varied shape. It may be of a constant (see slope ii) or a varying slope (see slopes i, iii and iv). While in the illustrated embodiments all of the slopes have a negative sign, slope i gradually become more pronounced as it gets closer to the maximum allowed value 113, slope iii is more pronounced in the middle of the limited power mode, and slope iv becomes less pronounced as it gets closer to the maximum allowed value 113. It will be appreciated that the slope should preferably not be too pronounced to ensure that there is no adverse effect on the PV system.

FIG. 4A also shows one of the possible alternative embodiments to using conventional curves and slopes. In fact, shown in grey is a curtailment "curve" in the form of a decreasing step function. It will be appreciated that the function defining the limited power mode in the curtailment curve may be any suitable decreasing function.

While the exemplary curtailment curves presented provide a value of power in Watts as a function of the bus voltage and/or optimizer's output voltage, it will be appreciated that the x-axis can correspond to any suitable control parameter, which is not limited to the bus voltage or the optimizer's output voltage and may be any suitable value (e.g., a current value, the total DC bus voltage, the series-loop string voltage, individual voltage requirement of the individual optimizers, etc.) or parameters, and that the y-axis can define any suitable optimizer parameter that may be used to define a limited power mode (e.g., a fraction of the power input, etc.).

The embodiments using curtailment curves can use various curtailment curves, including reference curtailment curves 111$_R$, which may be defined based on various DC bus parameters (e.g., the reference curtailment bus voltage 112, the maximum bus voltage 113, the present bus voltage, etc.), and local curtailment curves 111$_L$, which may be based on various local parameters of the optimizer 120 (e.g., the maximum power presently available—the optimizer's input-, the optimizer's output, etc.) and the latest reference curtailment curve 111$_R$.

It will be appreciated that the exemplary curves of FIGS. 4A and 4B are schematic representations that are useful to visual the various parameters of the curtailment curves discussed herein and general principle thereof, however, these figures are not intended to limit the curtailment curves to any specific shape or proportions. For example, the span of the curve corresponding to the MPPT mode (i.e., before the reference curtailment bus voltage 112) may be significantly greater than illustrated or the span of the decreasing/curtailment portion (and by extension the slope thereof) may be significantly greater or smaller than illustrated.

In FIG. 4B, two embodiments of local curtailment curves 111$_{L;1}$ and 111$_{L;2}$ that are based on reference curtailment curve 111$_R$. These various curves can illustrate how the change of required DC bus parameters (e.g., desired total DC bus power or voltage) can influence the control parameters determined or generated at the DC bus level and received by the various optimizers.

In this embodiment, the reference curtailment curve 111$_R$ can be defined by a desired bus voltage value (V$_{target}$) or present bus voltage (V$_{bus}$) (e.g., 450V), a reference maximum bus voltage value (V$_{max\_REF}$) 113 (e.g., 550V) and a reference curtailment voltage value V$_{curtail\_REF}$) 112 between the previous values (i.e., [V$_{target}$; V$_{max\_REF}$]). The limited power mode may be defined by a slope between this reference curtailment voltage value 112 and this reference maximum bus voltage value 113. For example, the curtailment voltage may be defined as the center value between the desired bus voltage value V$_{target}$ and the maximum allowed bus voltage value V$_{max\_REF}$ 113, which would be defined by the equation V$_{curtail\_REF}$=(V$_{target}$+V$_{max\_REF}$)/2 (e.g., which results in a V$_{curtail\_REF}$=500V).

In FIG. 4B the first local curtailment curves 111$_{L;1}$ and the second local curtailment curve 111$_{L;2}$ are both scaled down embodiments of the reference curtailment curve 111$_R$, where the scaling is based on the present optimizer's voltage output (V$_{out}$) and the reference curtailment curve 111$_R$ (or its parameters). For example, the scaling of the local curtailment curve may be defined by the ratio of the optimizer's output voltage over the bus voltage (i.e., V$_{out}$/V$_{bus}$).

For example, the local curtailment voltage (V$_{curtail\_local}$) can be determined using the present ("true") DC bus voltage (V$_{bus}$), the reference curtailment voltage (V$_{curtail\_REF}$) 112, and the local voltage output (V$_{out}$). In one embodiment, the local curtailment voltage can be calculated using the following equation:

$$V_{curtail\_local} = V_{curtail\_REF} \times \frac{V_{out}}{V_{bus}}.$$

For example, the local maximum voltage (V$_{maxl\_local}$) can be determined using the present ("true") DC bus voltage (or the desired bus voltage), the reference maximum voltage (V$_{max\_REF}$) 113, and the local voltage output (V$_{out}$). In one embodiment, the local curtailment voltage can be calculated using the following equation:

$$V_{max\_local} = V_{max\_REF} \times \frac{V_{out}}{V_{bus}}.$$

For example, the local maximum allowed power output (P_cc$_{max}$) can be determined using the present ("true") DC bus voltage (or the desired bus voltage), the maximum allowed bus power (P_bus$_{max}$), and the local voltage output (V$_{out}$). In one embodiment, the local curtailment voltage can be calculated using the following equation:

$$P\_CC_{max} = P\_bus_{max} \times \frac{V_{out}}{V_{bus}}.$$

FIG. 5 shows one embodiment of a method of controlling the optimizer's limited power mode to limit the power transferred from the PV input to the series-loop output of the optimizer 120 to manage its operating mode. In this embodiment, the limited power mode is based on curtailment curves 111.

In one embodiment, step S100 may require the desired DC bus operation parameters, which may be used in step S102 to determine the various reference curtailment curve parameters (e.g., define the curtailment voltage 112, the maximum voltage 113, the maximum bus power Power$_{max}$, etc.). It will be appreciated that step S1 of FIG. 3 may be a suitable embodiment for step S100.

Some embodiments may periodically or constantly use the present ("true") DC bus voltage to generate the reference curtailment curve parameters, the local curtailment curve parameters, to determine a control parameter, to select the operation mode of the optimizer, and/or to define operation parameters of the limited power mode of the optimizer. In such embodiments, step 101 of determining the present series-loop string voltage, e.g., by calculating or measuring it, before communicating its values to each optimizer on the series-loop can be performed at the DC bus (e.g., series-loop string comprising the bus).

Communication between the various components of PV system can be performed by exchanging information therebetween using any suitable communication module 1030 (e.g., a PLC, Wi-Fi, Bluetooth®, etc.) that can utilize wired or wireless technology.

The optimizers 120 of the PV system, can comprise a communication interface 1031 that may be compatible with the communication module 1030 of the PV system. Therefore, the communication interface 1031 (illustrated in FIG. 2 as PLC components 1224) of the optimizers 120 may be compatible with the communication module 1030.

Step S102 may be performed to generate new or updating previous reference curtailment curve parameters, which can include some of the embodiments of step S2 of the method of FIG. 3. This step can comprise generating the curtailment curve and/or defining some of its parameters (e.g., the reference maximum voltage ($V_{max\_REF}$) 113, reference curtailment voltage ($V_{curtail\_REF}$) 112, the maximum allowed bus power ($P\_bus_{max}$), slope parameters (type, shape, etc.) for the limited power mode, etc.) based on the latest desired DC bus operation parameters.

Step S103 includes some of the possible embodiments of step S4, where the control parameters are the reference limited power mode parameters.

Step S104 comprises determining local curtailment parameters (e.g., a local curtailment voltage ($V_{curtail\_local}$), a local maximum voltage ($V_{maxl\_local}$), a local maximum allowed power output ($P\_cc_{max}$), etc.), which can include generating a local curtailment curve, based on the received reference limited power mode parameters and the present bus voltage ($V_{bus}$).

Step S105 comprises using the received present ("true") bus voltage and the local curtailment parameters to determine under which of the possible operation modes (e.g., MPPT, limited power or shutdown mode) the optimizer needs to operate. This may be achieved by considering the optimizer's local voltage output ($V_{out}$) as a voltage input (x-axis value) of the local curtailment curve (as illustrated in FIG. 4B) and determining under which mode it is located.

If it is determined that the limited power mode is not required, but that one of the other modes (e.g., MPPT or shutdown mode) are required by the DC bus, step S106 of applying the required mode can simply be performed.

Otherwise, determining the power value (or fraction/proportion) corresponding to the present optimizer's voltage output using the local curtailment parameters and/or curve may be performed (step S107) to determine at which level the power should be limited when step S105 as concluded that the limited power mode should be applied. Once the level/proportion/value at which the power should be limited (e.g., the control over the power out of the total available power from the PV panel(s) that is converted and transferred onto the DC bus) is determined, the optimizer is controlled accordingly to apply the required limited power mode.

It will be appreciated that, if the power input of the optimizer exceeds the maximum power value of the local curtailment parameters or curve, the power converted/transferred over the optimizer's output may be limited accordingly even if it is operating under the "MPPT" mode (i.e., with a voltage lower than the local curtailment voltage value ($V_{curtail\_local}$)).

Optionally, the control may be maintained constant until the next update of the reference curtailment parameters and present DC bus voltage, or the control may be updated one or more times before the next update.

In such cases, any of the embodiments of step S6 described above that relates to curtailment can be applied.

Preferably, the last local curtailment parameters can be used (unchanged) and the intermediate control of the optimizer may be determined using intermediate values of the output voltage of the optimizer.

Finally, in some embodiments, steps S100 to S108 may be repeated periodically. It will be appreciated that, unlike the present DC bus voltage and the present optimizer's output value that need determining most iterations, the reference curtailment parameters may not be updated at every iteration.

FIG. 6A shows experimental results of a start-up sequence of four optimizers (120*a*, 120*b*, 120*c* and 120*d*) initiated around 0.125 seconds. The observed power variations over time show the power contribution of the various optimizers 120 onto the DC bus (here the series-loop string comprising the bus).

FIG. 6B shows voltage variations over time during the start-up sequence of the four optimizers (120*a* to 120*b*) connected in series in a series-loop of a DC bus of a PV system of the PV system.

FIG. 7 shows voltage variations over time during a PV rapid shutdown (PVRS) sequence of the four optimizers (120*a* to 120*b*) connected in series in a series-loop of a DC bus of a PV system of the PV system. FIG. 7 comprises a first period of time (before about 0.3 seconds) where normal behavior (MPPT, PWM or limited power mode of operation) of the optimizers is observed, a PVRS event is initiated at about 0.3 seconds, a second period of time of about 1 millisecond (between about 0.3 and about 0.301 seconds) for the optimizers and/or the PVRSS to detect the need/start of the PVRS (e.g., for the rapid shutdown command to reach the optimizers and to activate/initiate their respective rapid shutdown protocol), a third period of time of about 0.1 milliseconds for the output voltage of the optimizers to drop to their rapid shutdown levels, and a shutdown operation mode that limits the output voltage of the optimizers to have a maximum bus voltage of zero volts, about zero volts or a "residual" voltage or power of a few volts (respecting the various safety norms, e.g., less than the recommended maximum safe to touch voltages of 120 volts for adults or 60 volts for kids, preferably about 10 volts DC).

In some embodiments, the shutdown or RS mode of operation respect the standards requirement from the certification group CSA Group, i.e., having a residual voltage output of no more than about 30 V in DC or about 15 V in AC, and/or a residual power output of about 8 A and about 240 V·A during shutdown or rapid shutdown.

In some embodiments, once the PVRS is no longer needed, the PVRSS may request the PV system 10 or the optimizers 120 to initiate a start-up sequence.

Figure 14A:
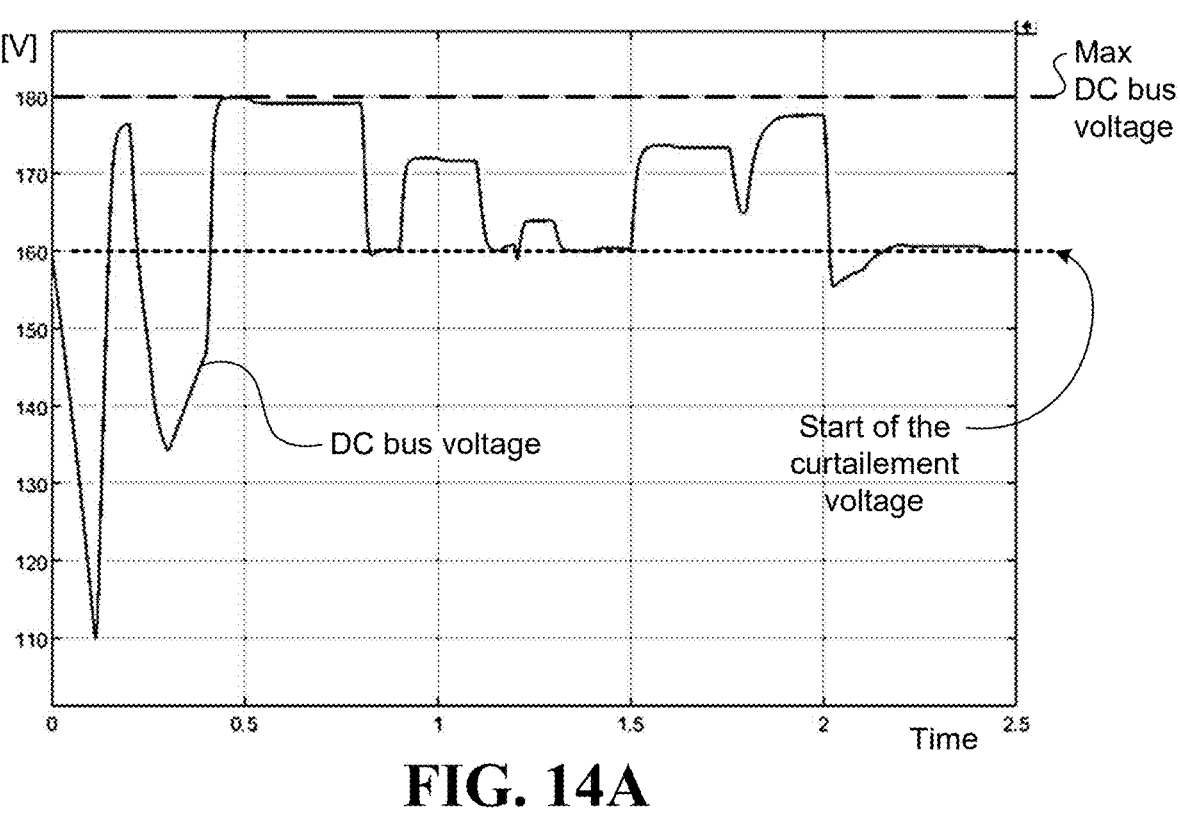
FIG. 14A shows experimental results of a change of DC bus voltage as a function of time when the limited power mode is defined using the curtailment-curve-based control method.
Figure 14B:
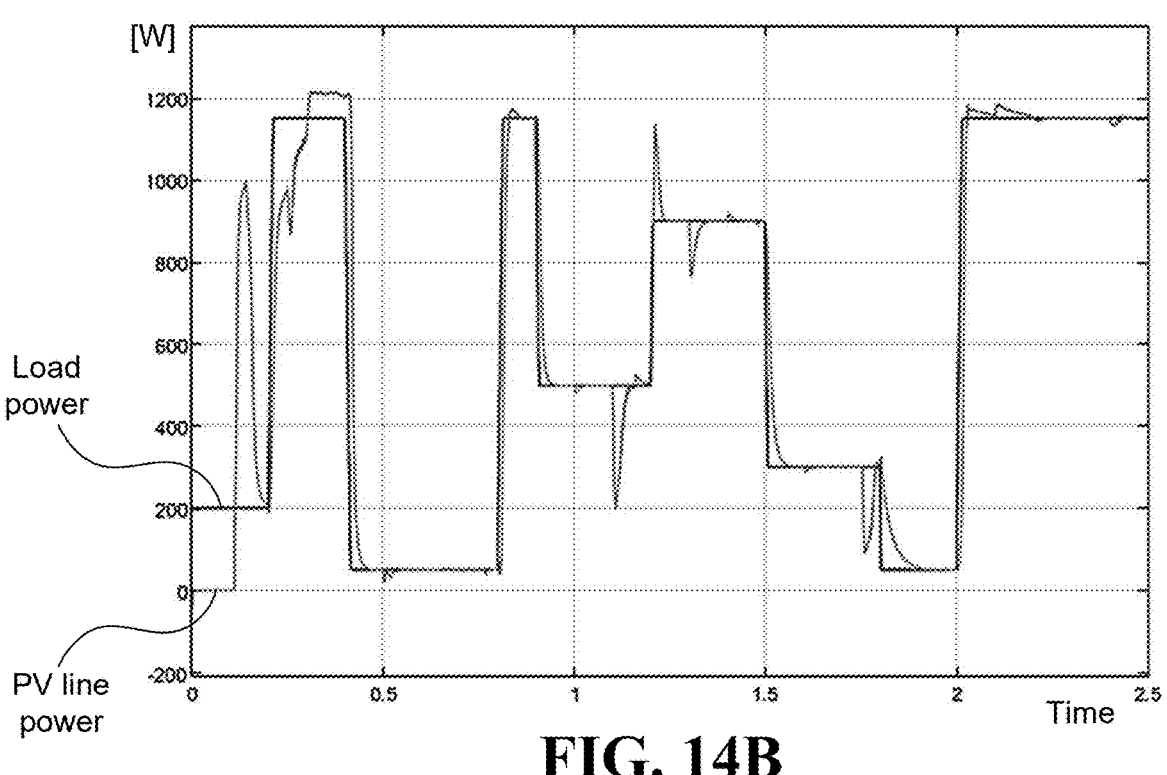
FIG. 14B shows experimental results of a variation over time of PV line power and the load power when the limited power mode is defined using the curtailment curve based control method.

FIGS. 14A and 14B show an experimental result of using the curtailment embodiment of the methods and apparatuses. These results show that the curtailment embodiments are not only viable but significantly reliable methods of controlling/driving the optimizers in a series-loop configuration.

FIG. 14A shows possible effects of using curtailment curves on the DC bus voltage over time of a series-loop comprising a plurality of optimizers, where the desired (minimal) DC bus voltage was set around 160V and the maximum DC bus voltage was set around 180V.

FIG. 14B presents the effects of using the curtailment curves on the power over the PV line over time for varying corresponding load power.

Signal-Free PVRSS

In the present disclosure, the term "rapid shutdown" (RS) in the context of PV rapid shutdown (PVRS) is understood to include any event or sequence that results in the limiting (i.e., reducing significatively, e.g., down to a few volts, amperes and volt-ampere, or even stopping) of the electric flow through the PV system, e.g., between the photovoltaic cells and the DC Bus. The term "shutdown" is intended to include the alternative terms known and used in the field of PV systems, such as the concepts and terms "standby mode", "power-down", "emergency-shutdown", "fast-shutdown", "automatic-shutdown", and the likes. Some embodiments of the shutdown can be provided by a PVRS system (PVRSS). It will be appreciated that a "shutdown" is intended to include the state where no electric flows across some key elements of the PV system (e.g., through the output terminal of the optimizers 120 and/or the DC bus 101) or that the electric flow is significantly limited/reduced (e.g., down to less than 30 volts) so as to be "safe" and respecting corresponding safety standards (e.g., the National Electrical Code (NEC) in the U.S.).

The following presents and describes various embodiments of a signal free PVRSS for the optimizers in a series-loop configuration.

The PV system of FIG. 1C can comprise a bus PVRSS module 100 that can enable the use of the signal-free PVRSS presented herein. It will be appreciated that some embodiments can have various additional advantages, such as reducing the energy required by the PV system to provide and run the PVRSS or such as avoiding the need to run a communication module exchanging signals between the plurality of optimizers and the PVRSS module (e.g., on the DC bus).

The optimizer 120 can determine a state or electrical property (e.g., current or voltage) of the electric flow on the DC bus by measuring variations in the electrical property (e.g., AC frequency or current) of its input 21. The present proposes using a electrical property sensor 124 (i.e., a detector circuit that may comprise a current sensor) to enable the determination of the state of the electric flow on the DC bus.

Figures 8A, 8B:
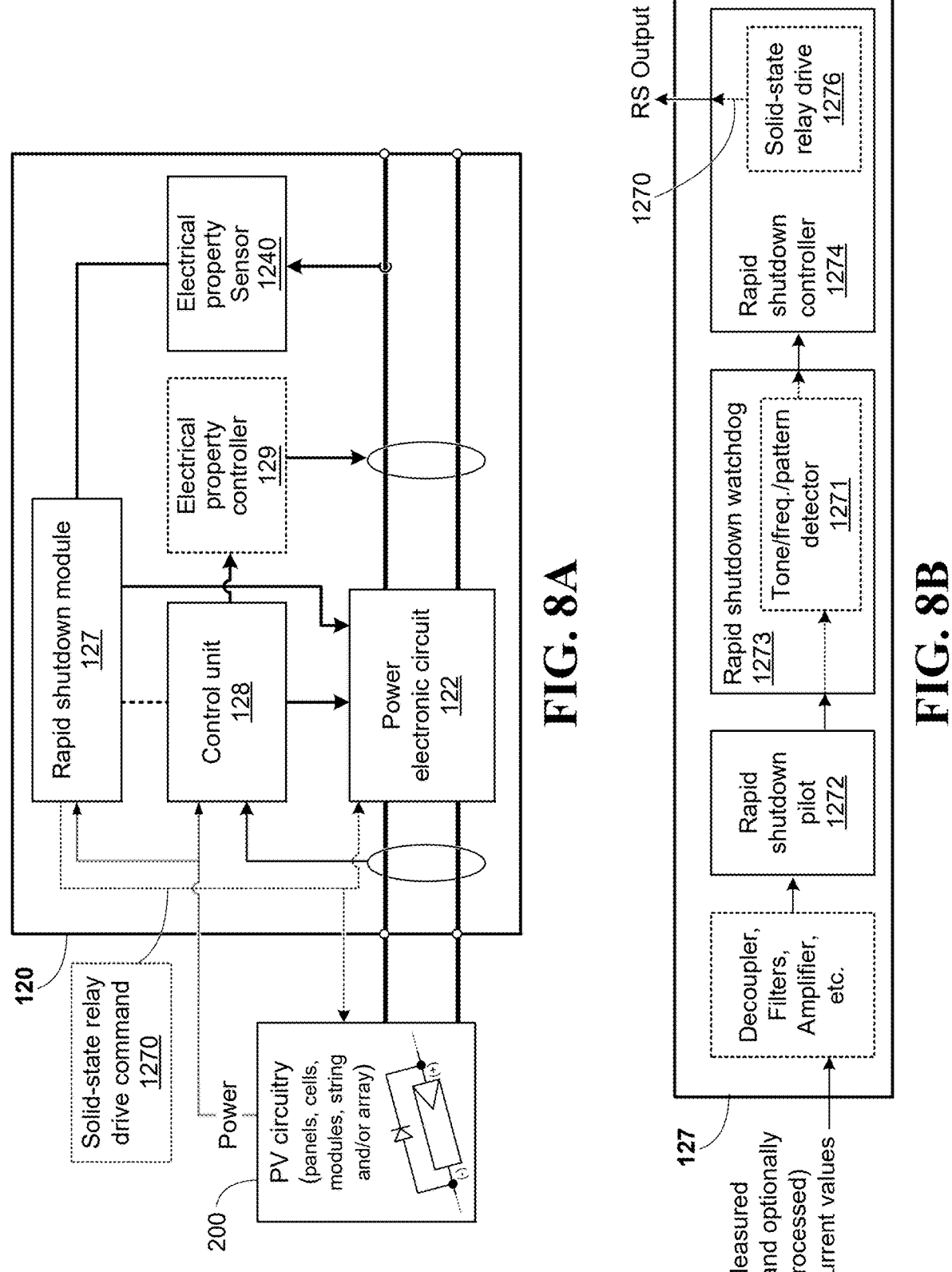
FIG. 8A is a block diagram of an embodiment of the optimizer comprising an alternative PV rapid shutdown system (PVRSS).
FIG. 8B is a block diagram of one possible embodiment of the rapid shutdown module of the optimizer for use in a series-loop string.

Now referring to the block diagram of FIG. 8A that illustrates possible embodiments of the optimizers 120, some embodiments can include an electronic circuit 122 for converting the electric flow from the input terminal 121$_{in}$ to the desired current or voltage output on the output terminal 121$_{out}$, a electrical property sensor 124, and control and managing components that can include, a MPPT 126, a control unit 128, a RS module 127 or a combination thereof to drive/control the activity of the optimizer 120, for example, by controlling/driving the power electronic circuit 122.

The optimizers 120 can comprise a RS module 127 that can receive measure values from the electrical property sensor 124, which may or may not get processed (e.g., decoupled, filtered, amplified, etc.) by optional dedicated circuit components (not shown) before reaching the RS module 127. The RS module's main function of detecting a need for RS and executing/activating the RS by limiting electric flow within the optimizer 120 and to the DC bus 101 or in the PC circuit 200 may be achieved by various means, including for example, driving/controlling a solid-state relay to physically opening the electric circuit (e.g., opening a switch in the power electronic circuit 122 or on the PV circuit 200), controlling the MPPT and/or the control unit to stop driving the power electronic circuit or to drive the power electronic circuit in a way that prevents electric flow therethrough, any other means known in the art, or any suitable combination thereof. In some embodiments, when the rapid shutdown switch actuates to initiate rapid shutdown (e.g., in response to the RS module 127), the DC bus voltage can disconnect from the solar array to prompt a module-level shutdown (e.g., shutdown of the optimizer 120).

While the embodiment of the rapid shutdown (RS) module 127 presented in the drawings as being part of the PV optimizer is shown as a component distinct from the other elements of the PV optimizer 120, it can be integrated within (e.g., programmed in) the other elements/components of the optimizer 120 (e.g., in the control unit 128 and/or the power electronic circuit 122). It will be appreciated that, while the RS module 127 is shown in FIG. 8A as being part of (integrated in) the PV optimizer 120, the RS module 127 can alternatively be provided by an external (e.g., modular) apparatus that is configured to be compatible with and to connect to a single or a plurality of PV optimizer 120. The embodiments of the RS module that are distinct from (e.g., external to) the PV optimizers may be provided with additional input and/or output interfaces (e.g., connections) for connecting to one or more PV optimizer or any additional components (e.g., components of the PV system, the series-loop string, the DC bus, the PVRSS module 100, the volt sensor of the optimizer, the electrical property sensor 124 of the optimizer, etc.). Similarly, the PV modules connectable to RS module 127 can also comprise any additional input and/or output interfaces for connecting to the RS module (e.g., to exchange information/data therebetween, e.g., to receive measurements from the electrical property sensor 124 of the optimizer). It will be appreciated that the RS module 127 can be connected to and may use one or more of the components of the PV optimizer (e.g., the electrical property sensor 124, volt sensor, communication module 1031, a processor and memory, a decoupler, filters, an amplifier, the input sensors 1223, the electrical property controller 129, solid-state relay, etc.) or may be provided/equipped with its own components (e.g., the electrical property sensor, solid-state relay 1270, etc.).

In some embodiments, the RS module 127 analyzes the received measurement from the electrical property sensor 124 (e.g., current readings/values from the electrical property sensor in embodiments where it is a current sensor) to determine whether or not a RS is required and, when required, activates or complies with a RS of the optimizer 120. In some embodiments, the RS module can relay the reading to the raw or processed current readings to the MPPT and/or the control unit alternatively, or in addition, to the analysis of the readings. In some embodiments, the RS module can receive from detector circuit (i.e., the electrical property sensor 124) measurements/readings of an electrical property (a value of a frequency of the AC current or an indication that the frequency is above or below a given frequency) of an AC current.

A RS may be required when various events occur such as, for example, a significant jump of current or voltage (e.g., power surge or above an acceptable threshold), a short-circuit, a manual activation of a shutdown switch, any other state-of-the-art events the person skilled in the art can expect, or a combination thereof. Consequently, the RS module 127 can trigger, activate or comply with the RS when it detects any of the possible events requiring and/or states of the measured electrical property or corresponding to a need for RS.

The RS may be required to provide emergency power reduction, isolation of solar arrays, automatic and manual activation, compliance with safety standards, protection during maintenance, minimization of electrical hazards in buildings, visual indicators and alerts, etc.

In some embodiments, the RS module 127 can use or detect various variations of electrical property on its output terminal 121$_{out}$ (i.e., from the DC bus—for optimizers connected in parallel or for the first optimizer of the series-connected optimizers—, or from its connection to the previous optimizer—for the other optimizers of the series-connected optimizers—) from the readings of the current sensor 124. In some embodiments, the current variations used by or characterized by the RS module can be, but are not limited to: a) apparition of a frequency (i.e., periodic variation of the electrical property's amplitude, e.g., around an average maximum amplitude); b) an increase or a decrease of frequency of the electrical property (e.g., of the DC bus current or its carrier frequency); c) a change of impedance and/or resistance on the electric flow resulting in a measured change of electrical property (e.g., current); d) a change in the continuity of the measured electrical property (e.g., a disconnection of the DC bus resulting in the absence of current and corresponding to an abrupt decrease or increase of amplitude of current); and e) a change of electrical property corresponding to one of the known patterns associated with RS requirements or states (e.g., a current variation pattern induced by the bus PVRSS module 100 on the DC bus or by using the electrical property controller 129 of optimizer).

It will be appreciated that, the RS module 127 shown in FIG. 8A may be part of the optimizer 120 as a program (code and memory), circuitry, or a combination thereof, and can be a distinct component/module or it may be integrated in, or part of, any suitable other component of the optimizer (e.g., the MPPT 126 and/or the control unit 128).

It will be understood that, when indicating that an optimizer 120 comprises the electrical property sensor 124 and the RS module 127, it includes embodiments where these components are connected to (not necessarily part of) the optimizer 120, which includes cases where the electrical property sensor and the RS module are modular or add-ons connected or added to a state-of-the-art optimizer.

The bus PVRSS module 100 can be configured to detect a command (e.g., receiving a shutdown command or an emergency switch being manually activated) or a need for an RS (e.g., detected power surged or short circuit).

It will be appreciated that, although illustrated as being a separate component in FIG. 8A, the rapid shutdown controller 127 can be integrated and programmed in or as part of the MPPT module 126 or the control unit 128. Similarly, the filters 125, MPPT module 126, or the electrical property controller 129 (i.e., current and/or voltage control circuitry) can all be implemented, if desired and if the type of component allows for it, in the control unit 128 of the optimizer 120.

In one embodiment, one or more frequency can be isolated using any components and means known in the art. The frequency can be used, for example, by the RS module to determine that a change of frequency occurs, thereby determining that a RS is required.

In some embodiments, the optimizer 120 can be equipped with a circuit enabling a modulation/control over the electrical property of electric power, which is referred to as an electrical property controller 129 (e.g., a current or impedance modulator circuit) that may be used by the control unit 128 to modulate the current and/or voltage output of the optimizer (e.g., on the output terminal 121$_{out}$). The electrical property controller 129 may be any circuitry known in the art that can enable control/change of electrical property (e.g., amplitude or frequency). The electrical property controller 129 can enable control over the voltage, the resistance and/or of the impedance to change the current's characteristics. Some embodiments of the electrical property controller 129 may be used to induce/generate one or more of the electrical property variations described herein.

The various components of the optimizer 120 may be configured to use raw power from the PV circuitry 200, the power electronic circuit 122 and/or the DC bus 101. In some embodiments, a power supply provided by the PV circuitry 200 may be preferable to ensure that the various components (e.g., the RS module 127) are able to perform their functions when a shutdown is ongoing as, in some cases, the PVRSS can be triggered or controlled (e.g., using a solid-state relay) to prevent any electrical power from flowing through the power electronic circuit 122 or through the output terminal 121$_{out}$. In some embodiments, the power supply may be provided by the power electronic circuit 122 and/or the DC bus 101 as, in shutdown mode, some minimal electric flow may be allowed through to allow for continued monitoring of the DC bus state or variations or specifically to provide power to the various components of the optimizer 120.

FIG. 8B presents a block diagram of a possible embodiment of the RS module 127 that can allow for the detection, identification or categorization of a RS need/request and to automatically apply a RS accordingly.

In some embodiments, the RS module 127 can comprise a RS pilot 1272 for monitoring the current flow on the output terminal 121out of the optimizer 120. In some embodiments, the RS pilot 1272 receives the values of measurements of current from the electrical property sensor 124 (raw or after being processed by the various optional components 125 and/or 125'). Note that the measurement processing components 125 may be different or similar to the measurement processing components 125', which can each or both be optional, may be separate from the RS module 127 as illustrated in FIG. 8A or can be comprised within the RS system as illustrated in FIG. 8B. In some embodiments the RS pilot 1272 can act as . . . .

The RS module 127 may further comprise a RS watchdog module 1273, which may optionally include a detector 1271, for detecting or identifying any variation of electrical property (e.g., current) of interest (that may be indicative of a need for RS) that may occur on the series-loop string (i.e., measured by and received from the electrical property sensor 124 of the output terminal). Some embodiments of the RS watchdog module can comprise a current variation detection circuit (as known in the art, e.g., a shunt-resistor or frequency detecting circuit) and/or a current variation analyzer (logic circuit and/or processor). The RS watchdog module 1273 can be used to identify that the received current values is indicative of a need for a RS and, optionally, may further determine specific parameters of the RS (e.g., a corresponding RS protocol: sequence of control commands for activating or comply with a specific shutdown mode or sequence/protocol) based on recognition of characteristics of that current (e.g., when one or more characteristics match a list of RS characteristic currents, which may be associated to a corresponding RS protocol). In some embodiments, the detector 1271 can be used to identify and/or extract values of various characteristics of the measured current (e.g., a tone, a frequency, a pattern, etc.), which may be used by the RS watchdog to select the appropriate RS protocol/response. In some embodiment the detector 1271 may not be necessary since the electrical property sensor 124 may be sufficient to perform the functions of the detector 1271.

It will be appreciated that the detector 1271 or a current sensor are some of the possible alternatives/embodiments of the property sensor 124.

The RS module 127 can also include a RS controller 1274 that can send control signals to various components and/or modules of the optimizer 120 in order to shut down the electric flowing through the optimizer 120, on its input terminal or its output terminal. In some embodiments, to enable the RS mode, the RS controller 1274 can send control signals to any one of the MPPT 126, the control unit 128, the power electronic circuit 122, any solid-state relay, the DC to DC converter 1221 or a combination thereof. In one embodiment, the RS controller 1274 can use a dedicated solid-state relay driver 1276 to send a solid-state drive command 1270 to any of the solid-state relays (e.g., a switch that open the circuit in response to the solid-state drive command).

There are various methods that can be used to provide a reliable PVRSS for various PV systems 10, which may require various embodiments of the optimizers 120. FIG. 9 shows one possible embodiment of various steps that may be performed to provide a RS of the PV system using the PVRSS.

The method can be successfully completed by means of measure, at the optimizer, the change of current corresponding to a rapid shutdown mode (step S33), which may be achieved after monitoring the state of electric flow on the output terminal 121$_{out}$ using the electrical property sensor 124, the various methods presented herein and the RS module 127 to identify a need for RS; activate or comply with a rapid shutdown of the optimizer 120 by limiting an electric flow therethrough (step S34) with the RS module 127 via any of the possible alternatives (e.g., controlling the control unit 128, the MPPT 126, a solid-state relay, etc.).

In some embodiment, the RS may be preceded by first detecting (e.g., with the bus PVRSS module 100) a command/trigger for rapid shutdown (step S30); initiate rapid shutdown protocol of the bus PVRSS module 100 (step S31), which can enable control of the electrical property (e.g., current) on the DC series-loop string (and/or on the output terminal 121$_{out}$ of the optimizers 120) to be in a rapid shutdown mode (step S32), meaning that variations of the DC bus current (and/or on the output terminal 121$_{out}$) are such that they can be picked up by RS module 127 of the various optimizers 120 connected in series and to the DC bus 101. The initiated RS protocol may depend on the origin of the need for RS such that various commands or triggers may induce various (e.g., specific) responses from the PVRSS, which may result in various (e.g., specific to each origin). In some embodiments, the RS module 127 may be configured to recognize a specific detected change of current on its output terminal associated to a specific RS mode.

In some embodiments, the PVRSS can further be used to monitor the current on the DC bus 101 during the shutdown mode (step S35); detect that shutdown is no longer required (step S36); terminate shutdown mode and resume normal functions (e.g., using the RS module 127) (step S37); and resume the monitoring of the electric flow on the DC bus 101 for any new indication that would imply a renewed need for rapid shutdown (step S38).

Alternatively or additionally, in some embodiments, the RS mode can be terminated and normal functions may be resumed in response to receiving a corresponding command from the PLC components 1224.

The following presents and details some of the possible embodiments of the methods and apparatuses that are not to be taken as strictly limiting the scope of the various embodiments enabled by the innovations detailed herein, such that additional embodiments and modifications may be made without deviating from the spirit and scope of the teachings.

The bus PVRSS module 100 can apply an RS frequency (i.e., a variation of the electric flow that is associated with a request for RS or used by the optimizer 120 to determine that RS is required) on the DC bus 101 by modulating/controlling the electric flow (e.g., current) on the DC bus 101 to induce a repeating change (e.g., sinusoidal change over time) of amplitude (e.g., around an average current value).

Figures 10A, 10B:
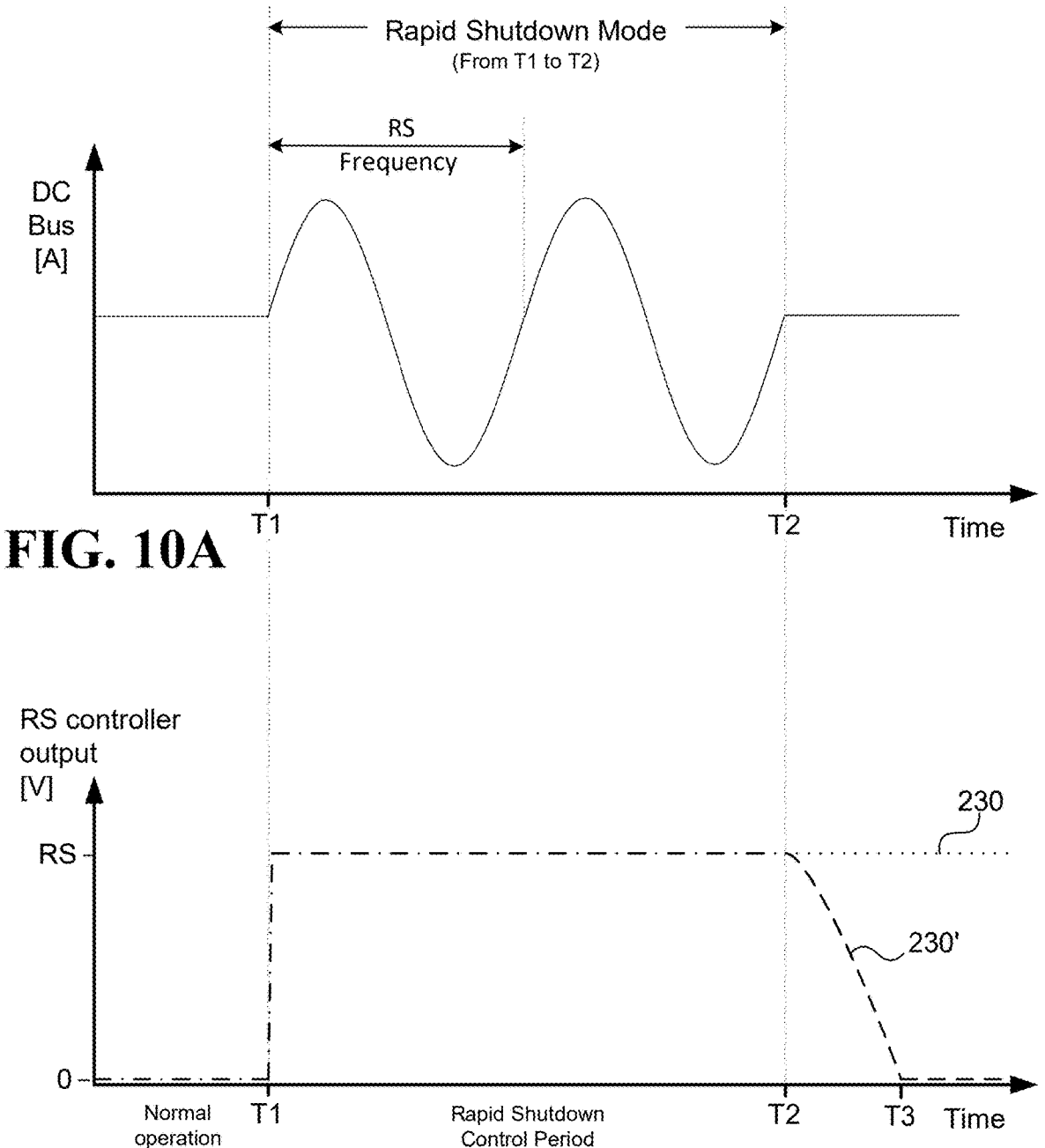
FIG. 10A shows an exemplary curve of the voltage on the DC bus as a function of time.
FIG. 10B shows exemplary curves of various embodiments of an AC detector output of a rapid shutdown controller of the optimizer as a function of time in corresponding to the variation shown in FIG. 10A.

FIG. 10A shows an exemplary curve of the voltage on the DC bus, respectively, as a function of time. In this example, the PVRSS induces a RS frequency (e.g., about 60 kHz or about 130 kHz) at a first moment T1, which may be maintained until a second moment T2. The frequency may be present for as long as the RS is required or momentarily to activate/apply a RS protocol that can then be sustained. Although the RS frequency is shown in FIG. 10A could be qualified as being a short pulse (i.e., two-period long pulse), the RS frequency on the DC bus may have any suitable duration or period of times.

FIG. 10B shows an exemplary output of an AC detector of one possible embodiment of the RS module 127 of the optimizer, where the output value (either about "0" corresponding to the normal state or ">0" corresponding to the RS triggering state) depends on and responds to the presence of the RS state frequency f2 detected between moments T1 and T2 in FIG. 10A.

It will be appreciated that RS mode detector (RS AC frequency detector) may be implemented, use by or part of any suitable elements of modules of the various embodiments of the RS module 127, which can be any one of the RS pilot 1272, the RS watchdog 1273, the RS controller 1274, etc.

In a first embodiment, the output 230 of the RS mode detector can remain on the activated state after the RS frequency is no longer present on the DC bus and/or on the output terminal 121$_{out}$ (i.e., after a moment T2) until a subsequent event (e.g., once another frequency corresponding to a request to resume normal state is detected—not shown) happens (e.g., detection of the other frequency for a certain amount of time), thereby avoiding an unwanted or accidental resuming or reinstating of the normal state of the optimizer. In another embodiment, the RS system provides some level of safety by having the amplitude of the RS output signal 230' of the AC detector decreasing/decaying once the RS frequency is no longer present (i.e., after a moment T2) over a relatively long time period (i.e., between moments T2 and T3), thereby requiring a certain amount of time during which the RS state frequency f2 is absent before the normal state can be reinstated. For example, this decaying of the RS trigger output of the RS controller.

Some embodiments of the bus PVRSS module 100 can be used to modulate the electric flow (e.g., current) on the DC bus 101, which may be achieved using a PLC circuit on the PowerDown side. The modulating can be achieved through inducing a variation (e.g., periodic change of amplitude of the current), which may take the form of an AC current or "ripples" on the electric flow having a given frequency. In some cases, two different frequencies must be used to distinguish the PLC's normal frequency from the RS frequencies.

Figures 11A, 11B, 11C:
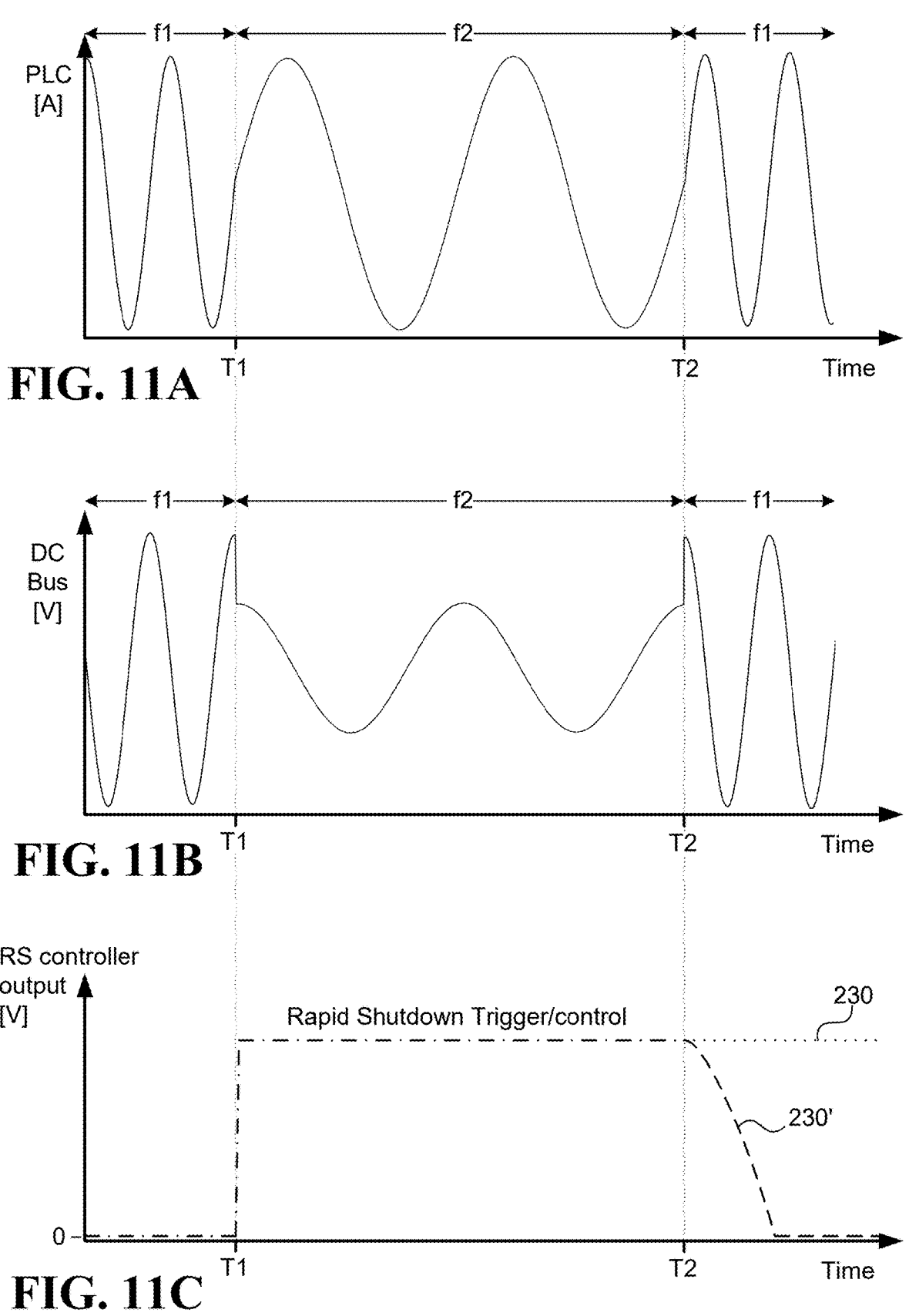
FIG. 11A shows an exemplary curve of the voltage on a Power Line Communication (PLC) as a function of time.
FIG. 11B shows an exemplary curve of the voltage on the DC bus as a function of time in corresponding to the variation shown in FIG. 10A.
FIG. 11C shows exemplary curves of various embodiments of an AC detector output of a rapid shutdown controller of the optimizer as a function of time in corresponding to the variation shown in FIGS. 11A and/or 11B.

For example, in FIGS. 11A and 11B, the normal state frequency may be set to a first frequency f1 (e.g., carrier frequency), e.g., at the default frequency for normal operation mode (e.g., of about 132 kHz) and a RS state frequency f2 may be set to a second frequency which, in some embodiments, should preferably be sufficiently different from standard PLC operation and the first normal state frequency (e.g., of about 60 kHz).

The variations induced on the electric flow reaching the optimizer 120 can be measured and/or identified by the electrical property sensor 124. In some embodiments, a decoupler and/or filter 125 may be used (before or after the electrical property sensor 124) to decouple isolate the variations of the electric flow induced by the bus PVRSS module 100 and/or to filter out the normal state frequency (e.g., 60 kHz filter) to avoid either the PLC or noise or interference triggering a false or unwanted RS of the PV system 10. Once measured and filtered, the RS module 127 can detect and identify a frequency of variation of the current (e.g., AC) using circuitry or programs. In such embodiments, the RS module can include a simple off-the-shelf AC detector as its signal detector. A small class D rectifier or similar circuit can be used for the AC detection circuit. The output of the RS module can be used to activate an inline solid-state relay (e.g., switch) or activate a RS function/mode of the control unit 128 of the optimizer 120, thereby enabling rapid shutdown.

For this embodiment, the AC detector can have an output/response as illustrated in FIG. 11C when the RS state frequency f2 is detected. As per the embodiments of FIG. 10B, the output of the AC detector can follow various behaviors once the RS state frequency is no longer detected. The output can remain on the activated state until a subsequent event/trigger is detected, thereby avoiding an unwanted resuming of the normal state of the optimizer and/or the amplitude of the RS output signal of the AC detector decreasing/decaying over some time before the normal state can be reinstated.

In some embodiments, the RS mode may be triggered or induced using an "alive" current variation (i.e., a regular, periodic or constant change of the current or AC frequency) that can be detected by the RS module 127 of the optimizers 120. In one embodiment, this "alive" current variation may be generated on the DC bus 101 (and/or on the output terminal 121$_{out}$), e.g., using the bus PVRSS module 100 or at least one of the optimizers 120. In some cases it may take the form of an AC signal (e.g., periodic/pulsed AC signal) of a specific, known, fixed or variable frequency (e.g., a RS state frequency f2). For example, the "alive" current variation 602 can be similar to one illustrated in FIG. 12B, where an AC current variation (e.g., of about 60 kHz) is periodically induced on the DC bus 101 (and/or on the output terminal 121$_{out}$).

In one possible embodiment, the "alive" current variation 602 may be generated in response to a pulsed source that outputs or uses a heartbeat pulse 601 to guide the generating of the "alive" current variation 602. For example, the elements that generate the "alive" variation 602 (e.g., the bus PVRSS module 100 or any of the optimizers 120) may do so in response to the output of an internal circuit element or a software that generated the heartbeat pulse 601, which may act like an internal clock that may or may not be synchronized with other components of the PV system 10.

For example, a 60 kHz AC current variation may be generated every second or so, e.g., at the AMP side, which may be considered and used as an indicative that the PV system 10 is in normal operating mode (i.e., "alive").

In some cases, this "alive" indication may be identified by various elements (e.g., the optimizers 120 or the PVRSS module 100) that may recognize this current variation (e.g., the normal state frequency).

For example, when a RS triggering event happens (e.g., when an automatic or manual RS switch is triggered), the corresponding control element of the PV system (e.g., PowerDown, bus PRVSS module 100 and/or the optimizers 120) can stop sending the heartbeat pulse 601 and/or the "alive" current variation 602, thereby terminating the normal operation mode (triggering the RS mode) of the PV system 10.

In some embodiments, this "alive" current variation may be used implemented on a circuit connection to a capacitor, where the capacitor would be charged when subjected to the "alive" current variation (e.g., AC current). For example, the charge of such a capacitor 603 could then follow the change over time of the capacitor's voltage 603 illustrated in FIG. 12C. In some of the cases, this could lead to the capacitor's voltage 603 to decrease/decay over time when the "alive" current variation is no longer present on the corresponding circuit connection (e.g., DC bus 101).

In some of these embodiments, the voltage of the capacitor 603 can be monitored continuously with the MCU 128 or the RS module 127 of the optimizers 120. When the RS is needed (e.g., when the RS switch is triggered), the dedicated control element of the PV system stops sending the heartbeat pulse 601 and/or the "alive" current variation 602. Hence, the MCU 128 or the RS module 127 identifies that a RS condition and applies the RS.

In some embodiments, when the triggering of the RS request is causing the capacitor's voltage 603 to decrease, the MCU 128 or the RS module 127 detects or responds to the decreased or absence of charge on the capacitor and applies the required controls to cause the RS.

Figures 12A, 12B, 12C:
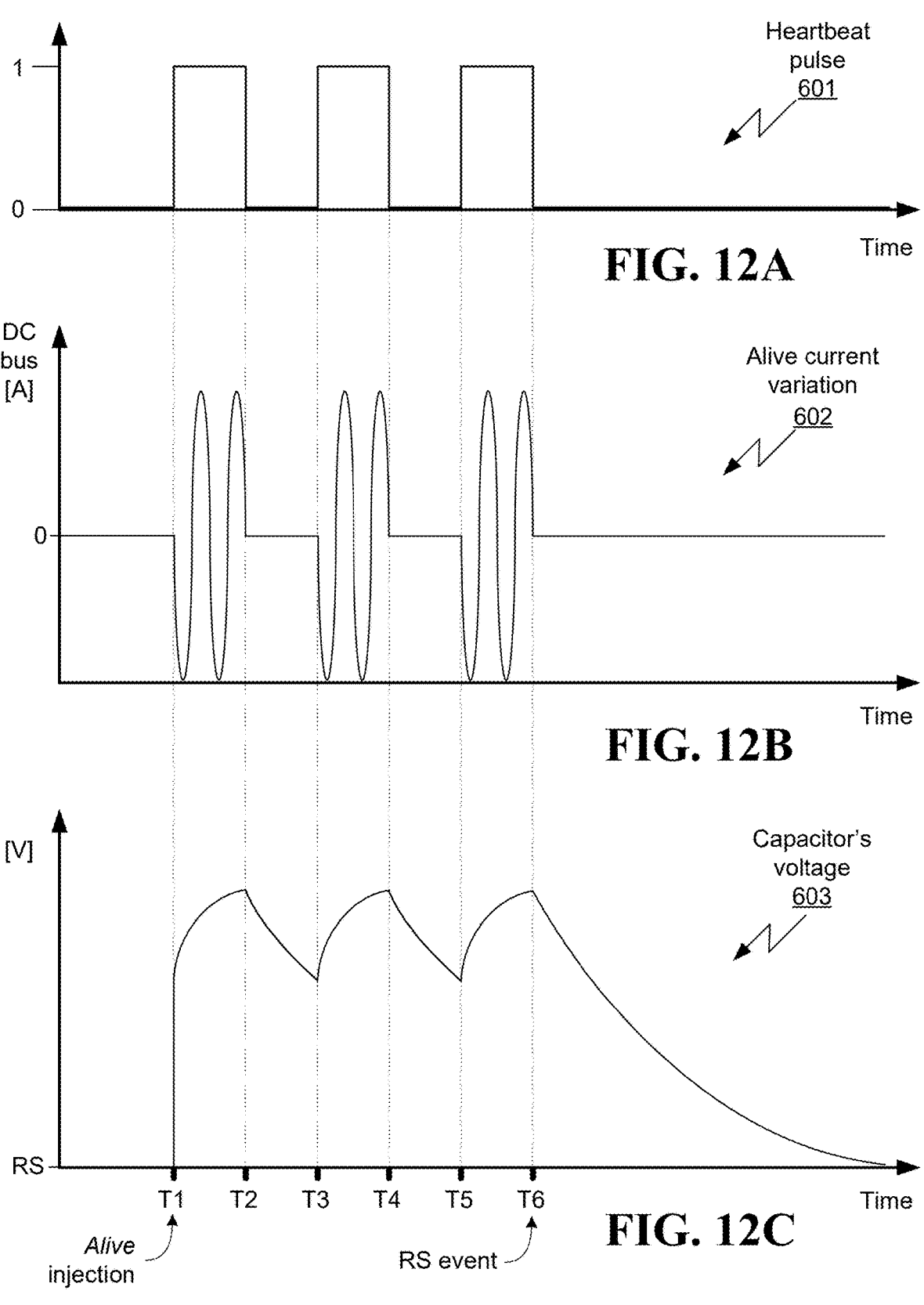
FIG. 12A shows an exemplary embodiment of a heartbeat/pulsed that can be used as a "clock" to generate various outputs or as an "alive" current variation.
FIG. 12B presents a periodic AC current applied on the DC bus and acting as an "alive" current variation indicating that the normal operating mode of the PV system can be maintained.
FIG. 12C shows a possible variation over time of a capacitor's charge voltage in response to a periodic current variation being applied.

In the exemplary embodiment of FIGS. 12A, 12B and 12C, the dedicated control element of the PV system uses the heartbeat pulse 601 (i.e., between T1 and T2, T3 and T4, and T5 and T6) to generate the "alive" current variation 602 (i.e., when the heartbeat pulse is ON=1), which is picked up by a dedicated capacitor that sees its charge voltage 603 change accordingly (i.e., increasing when the AC current is present and decreasing/decaying when the AC current is absent). In this example, a RS switch is triggered before T1 when the capacitor's voltage 603 is low and following T6 when the capacitor's voltage 603 starts decreasing.

It will be appreciated that some preferred embodiments can be alternatively function in an opposite logic, where the state of the current corresponding to a RS mode or a normal operating mode can be interchanged so that they correspond to a normal operating mode and a RS mode instead. For example, the principles used for the use of the "alive" current variations 602 may instead be used as an RS triggering current variation, or the principles used for the any of the RS frequency f2 could instead be used as the "alive" current variation.

It will be further appreciated that any suitable combination of the described embodiments can be used to provide the RS response of the PV system 10.

Figure 13B:
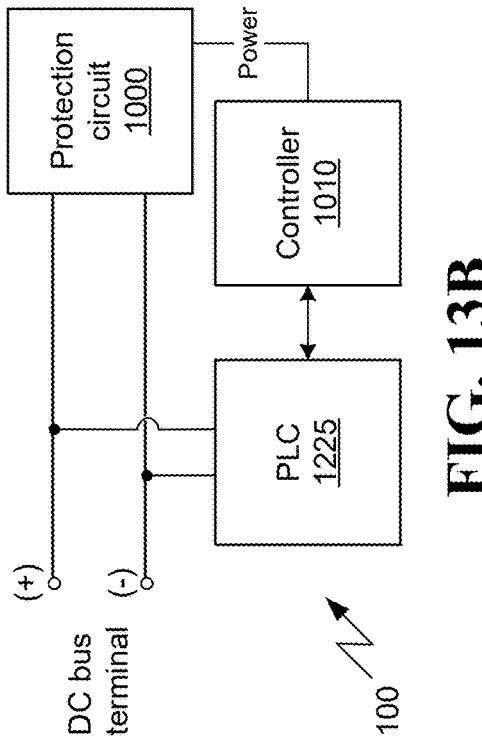
FIGS. 13A to 13D present a possible embodiment of the PVRSS that can control and induce variation on the DC bus current.
Figure 13D:
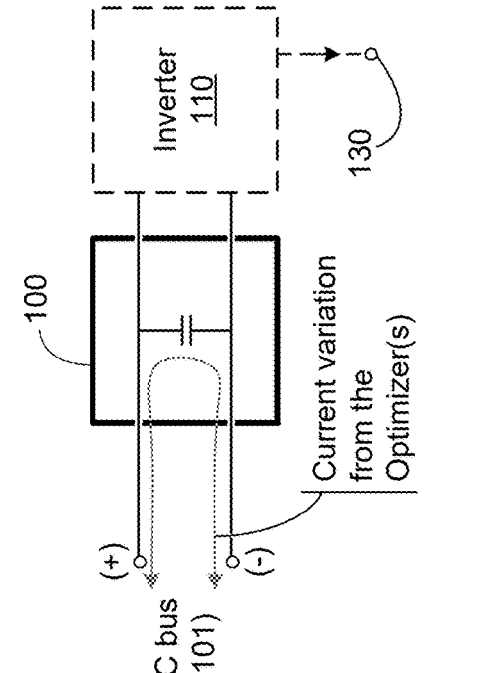
Figure 13A:
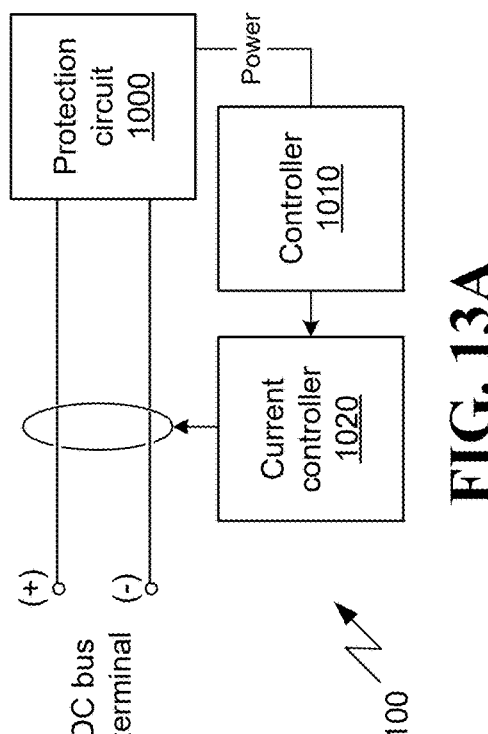

FIG. 13A presents a possible embodiment of the bus PVRSS module 100 of the PV system 10 that can control the current on the DC bus 101 using the current controller 1020 in response to the control parameters outputted by the controller 1010 of the PVRSS module 100. In some embodiments, the current controller 1020 (i.e., electrical property controller) is an off-the-shelf hardware component that can modulate the current (e.g., via pulse width, amplitude, pulse amplitude, frequency and/or phase modulation, current mode and/or hysteresis control, or digital modulation techniques), and may do so in response to the controls from the controller 1010 of the bus PVRSS module 100 (that may be hardware or software implemented), which can be provided power from the DC bus or from a protection circuit 1000 of the PVRSS module 100. The controller 1010 of the bus PVRSS module 100 may be configured and/or used to store programs that can recognize, select and/or generate control commands for the current controller 1020 so as to induce the desired change on the current of the DC bus 101 based on input information received from the output of the protection circuit 1000. The controller 1010 of the bus PVRSS module 100 can select the appropriate current control parameters based on the model of the charger controllers 120 or the selected (agreed upon) mode of operation of the bus PVRSS module 100 of the PV system 10.

As illustrated in FIG. 13B, some embodiments of the bus PVRSS module 100 further or alternatively comprises a communication module (1030), here PLC components 1225, to send and/or receive any relevant information that may be used by the various components of the PVRSS (e.g., the controller 1010 of the PVRSS module 100) and/or of the optimizer 120 (e.g., the PLC components or PLC line driver 1224). It will be appreciated that the controlled variations of current used for the RS method and apparatuses may be done with particular care to avoid any interference with the communications of the PLC (e.g., by avoiding using certain frequencies), thereby preventing any degrading or altering of the PLC communications and any misinterpreting of the PLC communications as a RS command/trigger. In some embodiments, the PLC of the bus PVRSS module 100 may be used to exchange some information between the optimizer 120 to ensure that the various parameters of the RS matches (e.g., to confirm that the normal operation frequency f1 and/or the RS frequency f2 are the same at the various optimizers 120 and at the PVRSS module 100). Note that traditional PLC modules do not control current, but instead uses existing electrical power lines (here the DC bus 101) to transmit data to the optimizer 120 by superimposing communications, by modulating high-frequency signals onto the existing power of the electric line.

Figure 13C:
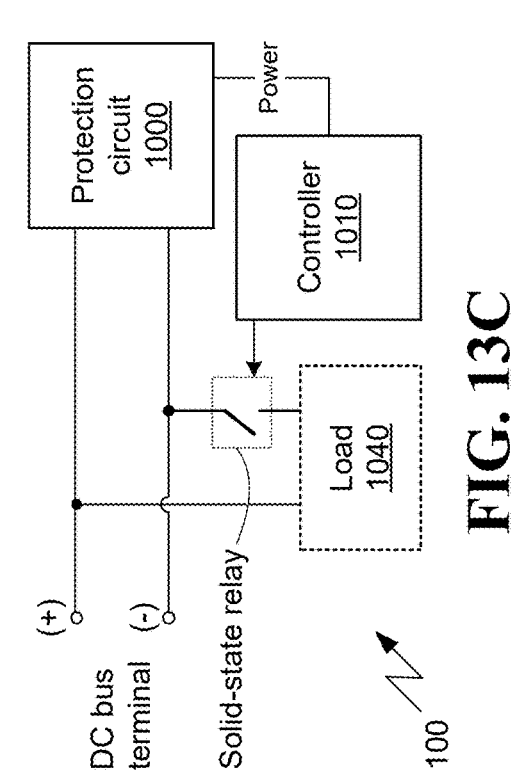

Now referring to FIG. 13C, in some embodiments, the PVRSS may rely on a change of the current induced by pulsing a load 1040 on the DC bus 101. The current (I) is a variable shared between all optimizers 120 in a PV string and the PVRSS module 100, so it can indicate the need for a RS without injecting any AC signal into the DC bus 101. The current draw from the optimizer 120 may be changed by switching (e.g., using a solid-state relay that may be controlled by the controller 1002 of the PVRSS module 100) a dummy load 1040 at the PVRSS module 100. In that case, all the optimizers 120 connected to the DC bus 101 will see a pulse current waveform with a specific frequency (similar to the heartbeat pulses of FIG. 12A). The frequency of switching dummy load that may be dictated by the controller 1010 of the bus PVRSS module 100 can specify the frequency of the pulse current waveform.

The pulse can then be identified by the optimizers, which can activate the RS mode of operation. In some embodiments, a tone detector circuit may be comprised in the RS module 127 of the optimizer 120, thereby avoiding any corresponding digital processing and avoiding a need to increase the control unit's 128 processing capacities (and corresponding increase of production cost).

In some embodiments, the load 1040 may be configured (e.g., a resistive load) to control the impedance and/or resistance of the DC bus perceived by each of the optimizers 120.

In some embodiments, the PVRSS are configured to induce a change of impedance and/or resistance on the DC bus (e.g., by controlling the current on the DC bus). In some cases, a behavior of the PV system can result in a change of impedance and/or resistance, which may correspond to events requiring shutdown. A change of and/or resistance may consist of increasing or decreasing the and/or resistance over or under a given threshold. Therefore, one embodiment of the method may utilize determining an and/or resistance of the DC bus (output of the optimizer's output terminals, e.g., a db AMPs lines) to detect the PVRS situation based on an impedance threshold and/or a resistance threshold, since PVRS situations can present high output and/or resistance. When the and/or resistance detected by the optimizer is above a certain threshold, the RS can be initiated by the optimizer.

An optimizer may be configured to determine (read or calculate) the impedance of its output terminals (of the DC bus) by determining a change of current ($\Delta I$) in response to an induced change of voltage ($\Delta V$), or vice versa. Therefore, the impedance (Z) may be determined using the change of voltage over the change of current $$\left( Z = \frac{\Delta V}{\Delta I} = \frac{V_2 - V_1}{I_2 - I_1} \right).$$

For example, the difference in voltage and current can be determined by inducing a change of voltage and measuring the resulting current at the optimizer's output between two times/moments ($V_1$ and $I_1$ at a first time, and $V_2$ and $I_2$ at a second time).

An optimizer may be configured to determine (read or calculate) the resistance of its output terminals (of the DC bus) by determining a first current ($I_1$) and a first voltage ($V_1$) at a first moment/time (e.g., at a random moment) and a second current ($I_2$) and a second voltage ($V_2$) at a second moment/time (e.g., at a random moment later than the first moment). Therefore, the change of resistance ($\Delta R$) may be determined using the current and voltage of the two distinct moments $$\left( R = \frac{V}{I} \rightarrow \Delta R = \frac{V_2}{I_2} - \frac{V_1}{I_1} \right).$$

An impedance-based method of detecting a need for RS and activating the RS mode of operation can comprise various advantages such as, for example, avoiding a need for communication (e.g., need to use PLC), allowing the various optimizers to independently determine the need for RS, avoiding the need for any additional hardware components. This being said, it may also present various challenges such as, for example, the impedance may be affected by the behavior of other PV system elements (e.g., the DC bus voltage, the other optimizers and the input power of the optimizer or change of the power-voltage MPP curve), and may affect the efficiency of the system by reducing stability (e.g., change in the output mean drifting from the optimal point in the MPPT curve).

To optimize its functionality and reduce the negative impact on the product performance, a selection of the following item may be preferably implemented:

1) this embodiment may preferably be used under certain current values (chosen current thresholds) since variations at the output of the optimizer could induce undesired variations on MPPT controller's setpoint, thus possibly reducing efficiency.

2) this embodiment may preferably be used over a certain voltage threshold; when open circuit is detected, natural behavior of optimizer may result in a rise of output voltage to keep following an MPPT setpoint.

3) PVRS detection impedance threshold should allow inaccuracy in impedance reading to compensate for variations that may result from interaction between optimizers (e.g., DC bus variations and/or PV MPPT setpoints), which could affect impedance reading. Therefore, the impedance-based method may rely on an estimation of the magnitude of the impedance (e.g., order in the change of impedance $\Omega$, k$\Omega$ or M$\Omega$).

4) Random switching patterns may preferably be used to reduce undesired interaction between two or more optimizers. It will be appreciated that, in order to prevent a null read of the impedance (e.g., when a plurality of impedance changes is read or induces simultaneously), it may be preferable to vary the moment when the change of impedance is induced or detected using random patterns and random output variation.

Now referring to FIG. 13D, in some embodiments, the PVRSS may rely on information from the various optimizers directly onto the DC bus (e.g., using PLC or wireless communication), which may be processed by a DC bus PVRSS module 100 or maintained on the DC bus.

In some embodiments, the bus PVRSS module 100 may be used to maintain/keep the information (e.g., current variations) from any one of the optimizers circulating on the DC bus. In one embodiment, the bus PVRSS module 100 may simply comprise a means (e.g., a capacitor) of transferring the information from one side (e.g., positive side) of the DC bus to the other side (e.g., negative side). In some embodiments, this can allow the various optimizers to exchange information therebetween and, optionally, with the DC bus PVRSS module 100. In one embodiment, the information on the DC bus from a given optimizer may be primarily intended for itself, e.g., such that the information (e.g., current variations) travels around the entire DC bus (e.g., series-loop string), which may act similarly to a detection "signal" and may be useful to detect any issues on the wiring of the DC bus. For example, this may be useful to detect if a RS switch is open, if a cable is cut or not connected properly, if a relay is open, etc.

A signal of a transceiver (TX) may be sent either capacitively or inductively (transformer), while the receiver (RX) would be current coupled (e.g., using a current transformer or a shunt current sensor with the right bandwidth). The received signal can be a band-pass filtered and amplified. In one embodiment, the reaction to not having the loop closed may result in the triggering of the RS (e.g., stopping of the power and/or setting a low voltage at the output).

In one embodiment, the optimizer controls/modifies the current to inject a specific frequency (e.g., hardware-based: utilize a tone detector—e.g., standard LMC567—with narrow bandwidth, using a RC oscillator using a digital resistance from the MCU, or using a MCU to generate a carrier frequency) onto the DC bus, a specific pattern (e.g., firmware-based: e.g., PLC components), a single pulse on the DC bus current, etc.

What is claimed is:

1. A photovoltaic (PV) optimizer apparatus connectable between a PV panel and a series-loop string, the apparatus comprising:

a PV input terminal for connecting to one or more PV panels;

series-loop string output terminals comprising a negative output terminal and a positive output terminal;

a DC to DC power converter connected to the PV input terminal for power input and to the series-loop string output terminals for power output, the DC to DC power converter having I) a first maximum power point tracking (MPPT) mode of operation in which available power from the PV input terminal is output to the series-loop string output terminals, II) a second limited power mode of operation in which a predetermined portion of available power from the PV input terminal is output to the series-loop string output terminals, and III) a third mode of operation in which a shutdown voltage is output to the series-loop string output terminals;

a bypass circuit for enabling current to flow between said series-loop string output terminals;

communications interface for receiving data from and transmitting data to a PV system communication module, the data comprising power curtailment reference function parameters; and a mode controller connected to the communication interface and the DC to DC power converter, wherein the mode controller is for receiving the power curtailment reference function parameters from the communication interface and for applying one of the first mode of operation and the second mode of operation of the DC to DC power converter based on said received data from the series-loop string, wherein said power curtailment reference function parameters comprise:

information about a maximum bus voltage point for MPPT operation and a higher bus voltage limit point at which the PV optimizers should output little to no power; or reference curtailment curve data, and wherein the mode controller is operative to convert the reference curtailment curve data into local reference curtailment curve data defining power curtailment as a function of voltage output to said series-loop string output terminals, said predetermined portion of available power in said second mode being determined by said local reference curtailment curve data.

2. The apparatus as defined in claim 1, wherein said mode controller applies, based on the received data from the series-loop string, one of the first mode of operation, second mode of operation and the third mode of operation.

3. The apparatus as defined in claim 1, wherein, in absence of signal from the communication interface over a period of time defined by PV rapid shutdown rules or safety standards, said mode controller applies the third mode of operation.

4. The apparatus as defined in claim 1, further comprising a loop current sensor for measuring a current of the series-loop string output terminals, wherein the mode controller is responsive to series-loop current measured by the loop current sensor to apply the third mode of operation when the series-loop current drops below a threshold.

5. The apparatus as defined in claim 3, wherein said third mode of operation of the DC to DC power converter is activated when the current of the series-loop reduces below a shutdown threshold.

6. The apparatus as defined in claim 1, wherein the mode controller is for autonomously applying one of the first mode and the second mode based on a determined voltage of the series-loop string received has one of said power curtailment reference function parameters.

7. The apparatus as defined in claim 1, wherein the mode controller is operative to define in the second mode of operation a fraction of available power from the PV input terminal to be output to the series-loop string output terminals based on said power curtailment reference function parameters.

8. The system as defined in claim 1, wherein said power curtailment reference function parameters comprise information about a maximum bus voltage point for MPPT operation and a higher bus voltage limit point at which the PV optimizers should output little to no power.

9. The system as defined in claim 8, wherein, when the DC to DC power converter operates in the second mode of operation, the DC to DC power converter outputs a fraction of available power from the PV input terminal to be output to the series-loop string output terminals according to a curtailment function or curtailment curve that is based on said information about the maximum bus voltage point for MPPT operation and on the higher bus voltage limit point.

10. The apparatus as defined in claim 1, wherein said power curtailment reference function parameters comprise reference curtailment curve data, and wherein the mode controller is operative to convert the reference curtailment curve data into local reference curtailment curve data defining power curtailment as a function of voltage output to said series-loop string output terminals, said predetermined portion of available power in said second mode being determined by said local reference curtailment curve data.

11. The apparatus as defined in claim 1, wherein said communication interface comprises power line communication (PLC) components.

12. The apparatus as defined in claim 1, wherein said mode controller further comprises a PV rapid shutdown module for controlling said DC to DC power converter to operate in the third mode of operation.

13. The apparatus as defined in claim 1, wherein the mode controller is further for applying one of (I) the first mode of operation, (II) second mode of operation, (III) the third mode of operation, and a further (IV) a fourth mode of operation for transferring all available power from the one or more PV panels to the series-loop string output terminals without applying any power conversion to said available power, wherein said mode controller is operative to apply said fourth mode of operation, when the power input from said PV input terminal is similar to power requirements of said series-loop bus, using one of the group consisting of: a) said DC to DC power converter; and b) a transparency circuit for connecting the PV input terminal to the series-loop string output terminals.

14. A PV system comprising:
said series-loop string;
at least two of PV optimizer apparatus, each PV optimizer apparatus connectable between a PV panel and a series-loop string, and comprising:
a PV input terminal for connecting to one or more PV panels;
series-loop string output terminals comprising a negative output terminal and a positive output terminal;

a DC to DC power converter connected to the PV input terminal for power input and to the series-loop string output terminals for power output, the DC to DC power converter having I) a first maximum power point tracking (MPPT) mode of operation in which available power from the PV input terminal is output to the series-loop string output terminals, II) a second limited power mode of operation in which a predetermined portion of available power from the PV input terminal is output to the series-loop string output terminals, and III) a third mode of operation in which a shutdown voltage is output to the series-loop string output terminals;
a bypass circuit for enabling current to flow between said series-loop string output terminals;
communications interface for receiving data from and transmitting data to a PV system communication module, the data comprising power curtailment reference function parameters; and
a mode controller connected to the communication interface and the DC to DC power converter, wherein the mode controller is for receiving the power curtailment reference function parameters from the communication interface and for applying one of the first mode of operation and the second mode of operation of the DC to DC power converter based on said received data from the series-loop string,
wherein said power curtailment reference function parameters comprise:
information about a maximum bus voltage point for MPPT operation and a higher bus voltage limit point at which the PV optimizers should output little to no power; or reference curtailment curve data, and wherein the mode controller is operative to convert the reference curtailment curve data into local reference curtailment curve data defining power curtailment as a function of voltage output to said series-loop string output terminals, said predetermined portion of available power in said second mode being determined by said local reference curtailment curve data,
said series-loop string output terminals of each of said PV optimizer apparatus connected in series to said series-loop string;
at least one PV panel for each of said at least two PV optimizers, each of said PV panel connected to said PV input terminal of each of said PV optimizers; and
a communication module connectable to said series-loop string to communicate to said communications interface of each of said PV optimizers, said communication module comprises a volt sensor for measuring a voltage of said series-loop string and is for communicating said power curtailment reference function parameters based on said measured voltage,
wherein said applying one of said operation modes by said mode controller of each of said PV optimizers is based on said power curtailment reference function parameters.

15. The system as defined in claim 14, wherein said power curtailment reference function parameters comprise information about a maximum bus voltage point for MPPT operation and a higher bus voltage limit point at which the PV optimizers should output little to no power.

16. The system as defined in claim 15, wherein, when the DC to DC power converter operates in the second mode of operation, the DC to DC power converter outputs a fraction of available power from the PV input terminal to be output to the series-loop string output terminals according to a curtailment function or curtailment curve that is based on said information about the maximum bus voltage point for MPPT operation and on the higher bus voltage limit point.

17. The system as defined in claim 14, further comprising a DC to AC power converter connectable to said series-loop string for converting DC power from said series-loop string to AC power.

18. The system as defined in claim 14, wherein one of said PV optimizers further comprises a PV rapid shutdown module for local determining a need for rapid shutdown and for triggering a rapid shutdown mode of operation of said one of said PV optimizers.

* * * * *